(12) United States Patent
Dubois et al.

(10) Patent No.: US 11,568,499 B2
(45) Date of Patent: Jan. 31, 2023

(54) SENSOR-BASED PREDICTIVE OUTAGE SYSTEM

(71) Applicant: Verizon Patent and Licensing Inc., Arlington, VA (US)

(72) Inventors: Jean F. Dubois, Boothbay Harbor, ME (US); Patrick J. Moran, Shrewsbury, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1276 days.

(21) Appl. No.: 15/591,273

(22) Filed: May 10, 2017

(65) Prior Publication Data

US 2018/0330242 A1    Nov. 15, 2018

(51) Int. Cl.
| | |
|---|---|
| *G06Q 50/06* | (2012.01) |
| *G06Q 10/06* | (2012.01) |
| *G06N 7/00* | (2006.01) |
| *G16Y 10/35* | (2020.01) |

(52) U.S. Cl.
CPC ............. *G06Q 50/06* (2013.01); *G06N 7/005* (2013.01); *G06Q 10/067* (2013.01); *G16Y 10/35* (2020.01)

(58) Field of Classification Search
CPC .............................. G06Q 50/06; G06Q 10/067
USPC ........................................................... 703/18
See application file for complete search history.

(56) References Cited

U.S. PATENT DOCUMENTS

| | | | | |
|---|---|---|---|---|
| 8,892,375 B2* | 11/2014 | Taft | ......................... | G01D 4/002 |
| | | | | 702/58 |
| 2016/0343093 A1* | 11/2016 | Riland | ................... | G06Q 10/04 |
| 2017/0212157 A1* | 7/2017 | Razon | ................... | G06Q 50/06 |

* cited by examiner

*Primary Examiner* — Brian S Cook

(57) ABSTRACT

A method, a device, and a non-transitory storage medium to receive from customer devices, sensor messages indicating a power state of on or off, a location, and a timestamp; select an element of a utility system based on the sensor messages; determine a power state of on or off for the element based on the sensor messages and a location and time pertaining to the element; store a temporal and spatial model that includes an outage event; receive weather data pertaining to the element; generate an outage model based on the temporal and spatial model and the weather data; receive forecasted weather data; calculate a predicted outage pertaining to one or more elements of the utility system based on the outage model and the forecasted weather data; and transmit a message that includes the predicted outage.

20 Claims, 30 Drawing Sheets

SENSOR-BASED PREDICTIVE OUTAGE SYSTEM

BACKGROUND

In any infrastructure that provides and/or delivers an asset or a service, it is important to be able to maintain the integrity of the infrastructure during transient environmental conditions, such as during weather-related conditions (e.g., storms, earthquakes, etc.), social-related conditions (e.g., political unrest, riots, etc.), or other types of conditions that may threaten the stability of the infrastructure. In many cases, recovery measures after an outage can extend for long periods of time and involve significant resources, such as personnel, and repair and maintenance equipment.

DETAILED DESCRIPTION OF PREFERRED EMBODIMENTS

Figure 1:
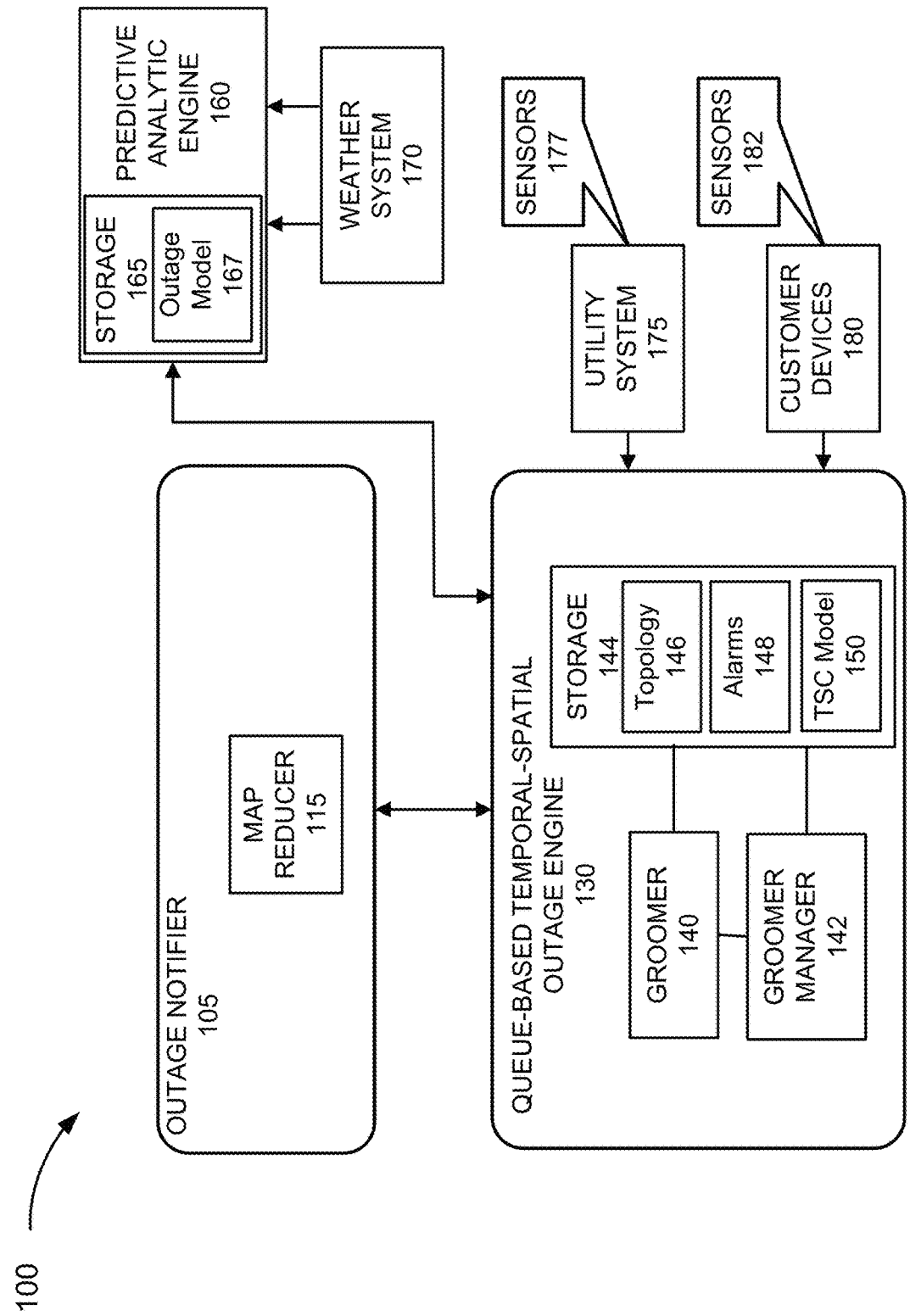
FIG. 1 is a diagram illustrating an exemplary environment in which an exemplary embodiment of a predictive outage service may be implemented.

The following detailed description refers to the accompanying drawings. The same reference numbers in different drawings may identify the same or similar elements. Also, the following detailed description does not limit the invention.

There are various infrastructures that are integral assets of modern society and living. For example, a utility grid (e.g., an electric grid, a gas grid, etc.) or other service-related network (e.g., telephone, television, Internet service, etc.) affords various conveniences of life, and may afford other facets of living (e.g., safety, etc.). Given the importance of these infrastructures, the maintenance and repair of these systems are fundamental. However, various conditions, such as weather-related conditions can cause an outage that impairs the service provided. In many cases, recovery measures after the outage can extend for long periods of time and involve significant resources, such as personnel and repair and maintenance equipment. Therefore, it would be beneficial to forecast the future needs and logistics for implementing the recovery measures.

In the context of a utility system, weather sensors may be used to identify "degree days" so as to prepare an electric grid. For example, extra feed stock, such as natural gas, coal, or distribution power may be purchased in anticipation of a weather-related load on the utility system. While this approach offers some advantages, it is limited because the effects of weather on elements of the electric grid itself are not monitored. For example, a secondary line of the electric grid may become damaged because of weather-related conditions, which may remove customers from receiving electric service.

The availability of data feeds provided by sensors from various domains inside and outside a utility system may provide deeper insight into conditions or states of the electric grid. Additionally, a domain inside the electric grid (e.g., distribution system, feeder system, etc.) or a domain outside the electric grid (e.g., customer premise equipment, devices in the home that use the electricity) may follow a defined model of behavior. The defined model of behavior may be generated based on historical data stemming from past events. For example, the state of elements (e.g., up, down, failed state, operational state, etc.) inside and outside the electric grid may be correlated to weather conditions. In view of this, the defined model may be used as a basis to predict future behavior inside the domain when events (e.g., weather conditions) similar to past events occur.

According to exemplary embodiments, a predictive outage service is described. According to an exemplary embodiments, the predictive outage services uses weather information, geographic location information, past grid performance information, topology and grid component information, and social feeds to predict when and where an outage will likely occur.

According to an exemplary embodiment, the predictive outage service learns the topology of various elements related to a utility service. According to exemplary implementation, the topology includes utility system capacity and feed stock capacity, a utility grid, and customer premise equipment of customers. According to an exemplary embodiment, the predictive outage service learns the characteristics of these elements and the elements themselves (e.g., topology, etc.) based on data received from sensors and use of a clustering system to associate observed outcome events to the sensed input events. According to an exemplary implementation, a flow simulation is used to interpret in situ data that is provided in real time.

FIG. 1 is a diagram illustrating an exemplary environment 100 in which an exemplary embodiment of a predictive outage system be implemented. As illustrated, environment 100 includes an outage notifier 105 and a queue-based temporal-spatial (QB-TS) outage engine 130. Outage notifier 105 includes a map reducer 115, and QB-TS 130 includes a groomer 140, a groomer manager 142, and a storage system 144. Storage system 144 includes a topology 146 alarms 148, and a temporal-spatial cluster (TSC) model 150. As further illustrated, environment 100 includes a predictive analytic engine 160, which includes a storage system 165. Storage system 165 includes an outage model 167. Environment 100 further includes a weather system 170, a utility system 175, sensors 177, customer devices 180, and sensors 182.

The number and arrangement of devices in environment 100 are exemplary. According to other embodiments, environment 100 may include additional devices, fewer devices, and/or differently arranged devices, than those illustrated in FIG. 1. Additionally, the number and arrangement of communication links between the devices are exemplary.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device).

Outage notifier 105 includes a component that provides a notification service. According to an exemplary embodiment, outage notifier 105 includes logic that makes predictive outage information available to an interested party. According to an exemplary implementation, outage notifier 105 communicates with a portal (not illustrated) that allows the interested party (e.g., utility personnel, etc.) to access and/or receive notifications regarding a predicted outage calculated according to the predictive outage service, as describe herein. As an example, the predictive outage information may indicate elements of the utility system that are predicted to failure or have a potential to fail by a threshold probability, a predicted time window of the failure or potential failure, location information pertaining to the elements, and a type of failure and/or outage that may occur. The predictive outage information may also indicate a location within which customers may be negatively impacted by the predicted failure/outage.

Map reducer 115 includes a component that provides a temporary memory space for use by groomer 140 and groomer manager 142 to update the TSC model. Map reducer 115 may obtain a copy of the TSC model stored in storage system 144, and store an updated version of the TSC model in storage system 144. Map reducer 115 may manage the incoming stream of real-time sensor data received from sensors 177 and sensor 182. For example, map reducer 115 dynamically manages the capacity of a grooming service to process the incoming messages received from sensors 177, 182 within a maximum delay time and according to a minimum event load. For example, the maximum delay may be on the order of seconds for loads of millions of events. Map reducer 115 may use grooming parameters, as described herein, as a basis to dynamically manage the capacity of the grooming service. Map reducer 115 is described further below.

QB-TS outage engine 130 includes a component that receives sensor data from sensors 177, 182, and uses the sensor data to generate TSC model 150. Although not illustrated, QB-TS outage engine 130 may include a queueing system that stores and maintains a queue for managing incoming sensor messages received. QB-TS outage engine 130 may also convert the sensor messages into a normalized message format because the sensor data may be received from a variety of customer devices 180 and sensors 182. QB-TS outage engine 130 also includes a component that communicates with other components of the predictive outage system, as described herein.

Groomer 140 includes a component that provides a grooming service via which TSC model 150 is generated. According to an exemplary embodiment, groomer 140 receives sensor data from sensors 182. Groomer 140 correlates the location of the sensors 182 to elements of a circuit of utility system 175. Groomer 140 determines the states of customer devices 180 related to the circuit of utility system 175. Groomer 140 determines the state of elements of the circuit based on the states of the customer devices 180. Groomer 140 may identify different types of outages (e.g., an outage, an embedded outage, etc.) and false positives. Groomer 140 is described further below.

Groomer manager 142 includes a component that manages groomer 140 and map reducer 115. For example, groomer manager 142 may start and stop the grooming service, manage time for analyzing an event, and manage the updating of TSC model 150. Groomer 142 is described further below.

Storage system 144 includes a component that provides storage. For example, storage system 144 may be implemented as a mass storage device. Storage system 144 may include a database management system (DBMS). The DBMS may be implemented using conventional, well-known, or commercially available relational or NoSQL software/packages (e.g., Microsoft SQL, Oracle Database, Cassandra, MongoDB, etc.). Storage system 144 may include logic that provides an interface to a user to store, update, delete, perform a search or a lookup, etc., pertaining to the data stored in storage system 144.

Topology 146 includes data indicating a topology of a utility system. For example, topology 146 may indicate various elements of feeder system and an electric grid. The data may also indicate other attributes of the utility system, such as circuits, direction of flow for electricity/power, identifiers of the elements, types of the elements (e.g., transformer, generator, distribution line, transmission line, etc.), the location of the element (e.g., latitude, longitude, altitude values), time (e.g., date and timestamp), and/or configuration data of an element. For example, the configuration data may indicate one direction of flow of electricity over another direction occurring at a switch at any given instant in time. In this regard, certain characteristics of the topology or behavior of the elements in the utility system may be dynamic and change over time. According to an exemplary implementation, the utility environment may be represented as a nodal graph matrix (NGM).

Alarms 148 include data indicating failure and restore events that occur in utility system 175 and by customer devices 180. For example, alarms 148 may include the sensor data received by sensors 177, 182. By way of further example, as described herein, the sensor data from sensors 177 may include state data indicating the state of the element of utility system 175 (e.g., up, down, operating normal, not operating normal, power off, power on, etc.), time data indicating an instance of time (e.g., date and timestamp) pertaining to the state data, identifier data indicating an identifier of the element to which the sensor data pertains, and location data pertaining to the element. The sensor data from sensors 182 may include similar data in relation to customer devices 180.

TSC model 150 includes data that indicates the elements and topology of utility system 175, state data pertaining to the elements of utility system 175, failure data, and time data. TSC model 150 may include an M-dimensional NGM, which includes interconnections representative of dependencies between the sensors (e.g., sensors 177, 182) and the utility environment, and may be adapted over to time to indicate various relationships between elements in the utility environment.

Predictive analytic engine 160 includes a component with machine learning logic. According to an exemplary embodiment, predictive analytic engine 160 uses outage model 167 as a basis to predict failures and/or outages that may occur based on weather data. Predictive analytic engine 160 includes logic that generates notifications indicating predicted outages/failures, and provides these notifications to outage notifier 105 via QB-TS engine 130, which may be made available to an interested party. Predictive engine 160 is described further below.

Storage system 165 includes a component that provides storage. For example, storage system 165 may be implemented as a mass storage device. Storage system 165 may include a DBMS. The DBMS may be implemented using conventional, well-known, or commercially available relational or NoSQL software/packages (e.g., Microsoft SQL, Oracle Database, Cassandra, MongoDB, etc.). Storage system 165 may include logic that provides an interface to a user to store, update, delete, perform a search or a lookup, etc., pertaining to the data stored in storage system 165.

Outage model 167 includes data used to provide the predictive outage service. According to an exemplary implementation, outage model 167 includes TSC model 150, weather data, and area topology data. The weather data is obtained from weather system 170 and indicates past, current, and forecasted weather conditions pertaining to a geographic area, as described herein. The area topology data may indicate characteristics of the area within which an element of the utility system resides. For example, the area topology data may indicate the type of vegetation (e.g., trees, bushes, or other forms of plants) and proximity to elements of the utility system, the type of water sources (e.g., streams, lakes, oceans, inland waterways, or other water bodies) and proximity to elements of the utility system, the type of terrain (e.g., open terrain without buildings/homes, developed terrain with buildings, high-wind terrain, or other type of terrain) proximate to the elements of the utility system. The area topology data may be obtained from a third party based on the known locations of the elements of the utility system. Outage model 167 may also include other types of data, such as work order data pertaining to repairs of elements of the utility system (e.g., types of repairs, dates and times, etc.), trimming and removal of vegetation, and weather-related incidents (e.g., fallen trees due to storm at a particular locale, etc.). The work order data may be obtained from the utility service provider.

Weather system 170 includes a network device that provides weather data. The weather data may indicate past, current, and forecasted weather conditions pertaining to a geographic area. For example, the weather data may indicate temperature, humidity, wind conditions (e.g., speed, etc.), precipitation (e.g., rain, sleet, snow, etc.), pressure, direction, time, location, storm conditions (e.g., moderate, mild, severe, record-breaking, hurricane, tsunami, etc.), other weather-related metrics/conditions, and/or environmental information (e.g., earthquake, etc.). The geographic area includes areas in which utility system 175 and customer devices 180 are located. The geographic area may include areas remote from utility system 175 and customer devices 180 for use in predicting outages or other events.

Utility system 175 includes various elements of a utility infrastructure that provide a utility service. According to an exemplary implementation, utility system 175 includes a feeder system and an electric grid that provides electric service to customers. According to such an implementation, the infrastructure may include various elements, such as, for example, generators, transformers, primary lines, secondary lines, transmission lines, distribution lines, substations, voltage regulators, surge protector devices, line termination devices, switchgear devices, and/or other types of elements in an electric power grid that contribute to the generation, transmission, or distribution of electricity to customers. According to other exemplary implementations, utility system 175 may include a feeder system, a distribution system, and/or a delivery system that provides some other type of asset or service (e.g., gas, water, etc.).

Sensors 177 include logic that detects states of elements of utility system 175. For example, each sensor 177 may detect when an outage has occurred with respect to the element of utility system 175. By way of further example, a transformer of utility system 175 may include sensor 177 that detects when the transformer goes down (e.g., suffers loss of power). Sensor 177 may also detect when the transformer is up and operational. According to an exemplary implementation, sensor 177 generates and transmits sensor data to QB-TS outage engine 130. For example, sensor 177 may proactively transmit (e.g., periodically, etc.) and/or reactively transmit (e.g., in response to a change of state) the sensor data. According to an exemplary implementation, the sensor data includes state data indicating the state of the element (e.g., up, down, operating normal, not operating normal, etc.), time data indicating an instance of time (e.g., date and timestamp), and identifier data indicating an identifier (e.g., a unique identifier) of the element to which the sensor data pertains. The sensor data may also include location data indicating a location or geographic coordinates (e.g., latitude, longitude, elevation) of sensor 177 and/or the element.

There may be instances when an element of utility system 175 may be purposely taken off-line (e.g., by a technician or other utility personnel), which sensor 177 may detect. However, as described herein, the predictive outage system may filter sensor data to determine when a false positive occurs.

Customer devices 180 include devices that use the utility service provided by utility system 175. According to an exemplary implementation, customer devices 180 may include customer premise equipment pertaining to the utility service, customer premise equipment pertaining to another service (e.g., a telephone service, a television service, an Internet service, a security alarm service, etc.), an Internet of Things (IoT) device, or an end user device. By way of further example, customer devices 180 may be implemented to include a utility meter, a line termination device (e.g., optical network unit (ONU), optical network terminal (ONT), a satellite dish, a network termination point (NTP), etc.), a smart device, a router, a set top box, an appliance (e.g., a refrigerator, a washer, a dryer, etc.), a media server, a telephone, or other type of device that receives electricity from an outlet. According to other exemplary implementations, depending on the type of utility system 175, other types of customer devices 180 may be implemented. For example, when utility system 175 delivers gas, customer devices 180 may include a gas fireplace and a water heater. Alternatively, for example, when utility system 175 delivers water, customer devices 180 may include a water heater, a water tank, and/or a water pressure regulator.

Sensors 182 include logic that detects states of customer devices 180. For example, each sensor 182 may detect when a loss of power has occurred with respect to customer device 180. By way of further example, a water pump may include sensor 182 that detects when the power goes off. Sensor 182 may also detect when the water pump is up and operational. According to an exemplary implementation, sensor 182 generates and transmits sensor data to QB-TS outage engine 130. For example, sensor 182 may proactively transmit (e.g., periodically, etc.) and/or reactively transmit (e.g., in response to a change of state) the sensor data. According to an exemplary implementation, the sensor data includes state data indicating the state of customer device 180 (e.g., up, down, operating normal, not operating normal, etc.), time data indicating an instance of time (e.g., date and timestamp), and identifier data indicating an identifier (e.g., a unique identifier) of customer device 180 to which the sensor data pertains. The sensor data may also include location data indicating a location or geographic coordinates (e.g., latitude, longitude, elevation) of sensor 182 and/or customer device 180.

There may be instances when customer device 180 may be purposely unplugged (e.g., by a technician or a user), which sensor 182 may detect. However, as described herein, the predictive outage system may filter sensor data to determine when a false positive occurs.

Figure 2:
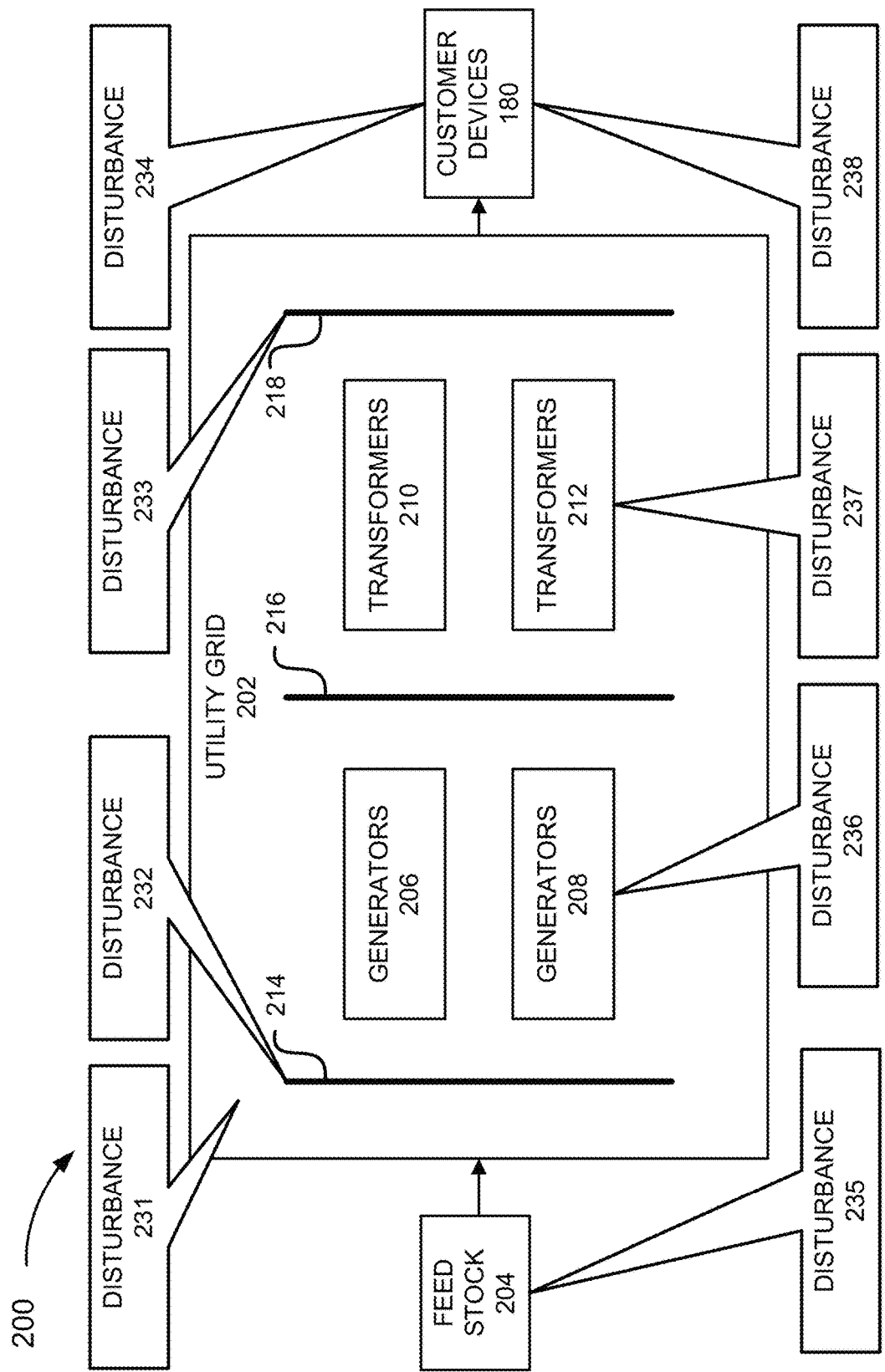
FIG. 2 is a diagram illustrating exemplary elements in a utility environment.

FIG. 2 is a diagram illustrating an exemplary utility environment 200 that includes a feed stock 204, a utility grid 202, and customer devices 180. Utility grid 202 includes generators 206, transformers 210, transmission lines 214, and distribution lines 216 and 218. Various elements of feed stock 204 and utility grid 202 include sensors 177 (not illustrated) that detect disturbances 231-233 and 235-237 (e.g., outages, off-line, etc.). However, some elements of feed stock 204 and/or utility grid 202 may not include sensors 177. Also, customer devices 180 include sensors 182 (not illustrated) that detect disturbances 234 and 238 (e.g., power off).

FIGS. 3A-3F are diagrams illustrating an exemplary process of the predictive outage service. As illustrated, sensors 175 may transmit (e.g., stream in real-time) sensor messages 301, and sensors 178 may transmit sensor messages 302, to QB-TS outage engine 130. Sensor messages 301, 302 may include sensor data, as previously described. QB-TS outage engine 130 may format (e.g., normalize) and queue the sensor messages. During this time, grooming manager 142 may invoke the grooming service. The queued and normalized messages are provided to groomer 140. According to this exemplary scenario, assume that the sensor messages 301, 302 indicate loss of power or an outage. QB-TS outage engine 130 may also store the sensor data in alarms 148.

Groomer 140 determines a state of each customer device 180 based on the received sensor messages 305. For example, groomer 140 uses the state data, the time data, the location data, and the identifier data to calculate a geographic area regarding the received sensor messages and the states of customer devices 180. Groomer 140 may also correlate the geographic area to candidate circuits of utility system 175. According to an exemplary implementation, groomer 140 identifies a center location of the geographic area within which the outage pertains. Groomer 140 may select candidate circuits and elements of utility system 175 that may provide electric service to the customer devices 180 located within the geographic area based on the proximity of the candidate circuits and elements relative to the center location. Groomer 140 may correlate the candidate circuits and elements with the sensor data received by sensors 177, and identify the states of these candidate circuits and elements.

QB-TS outage engine 130 may continue to receive additional sensor messages 301, 302 indicating loss of power or a failure, depending on the geographic reach of the event. However, as further sensor messages 301 and/or 302 are received, groomer 140 may repeat the process of determining the state of each customer device 180, correlating the geographic area to candidate circuits, and expanding outward from the center location the geographic area so as to encompass the effected customer devices 180 and circuits/elements of utility system 175. Groomer 140 may identify an outage that is shared amongst customer devices 180 and utility system 175 based on the number of customer devices 180, distances from each other and relative to circuits/elements of utility system 175, and the occurrence of the failures within a certain time window. This process is further described in relation to FIG. 7.

Figure 3A:
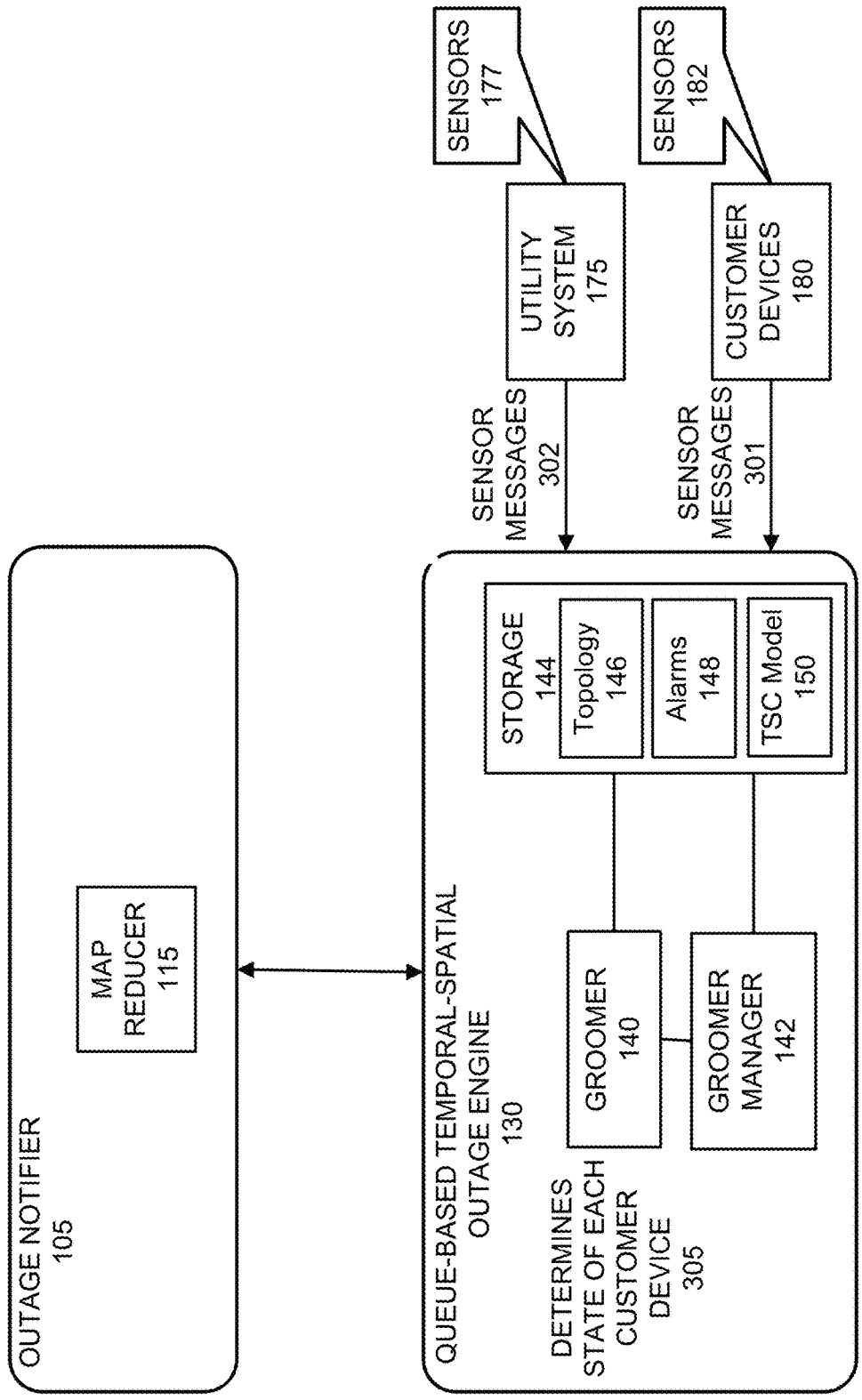
FIGS. 3A-3F are diagrams illustrating an exemplary process of the predictive outage service.
Figure 3B:
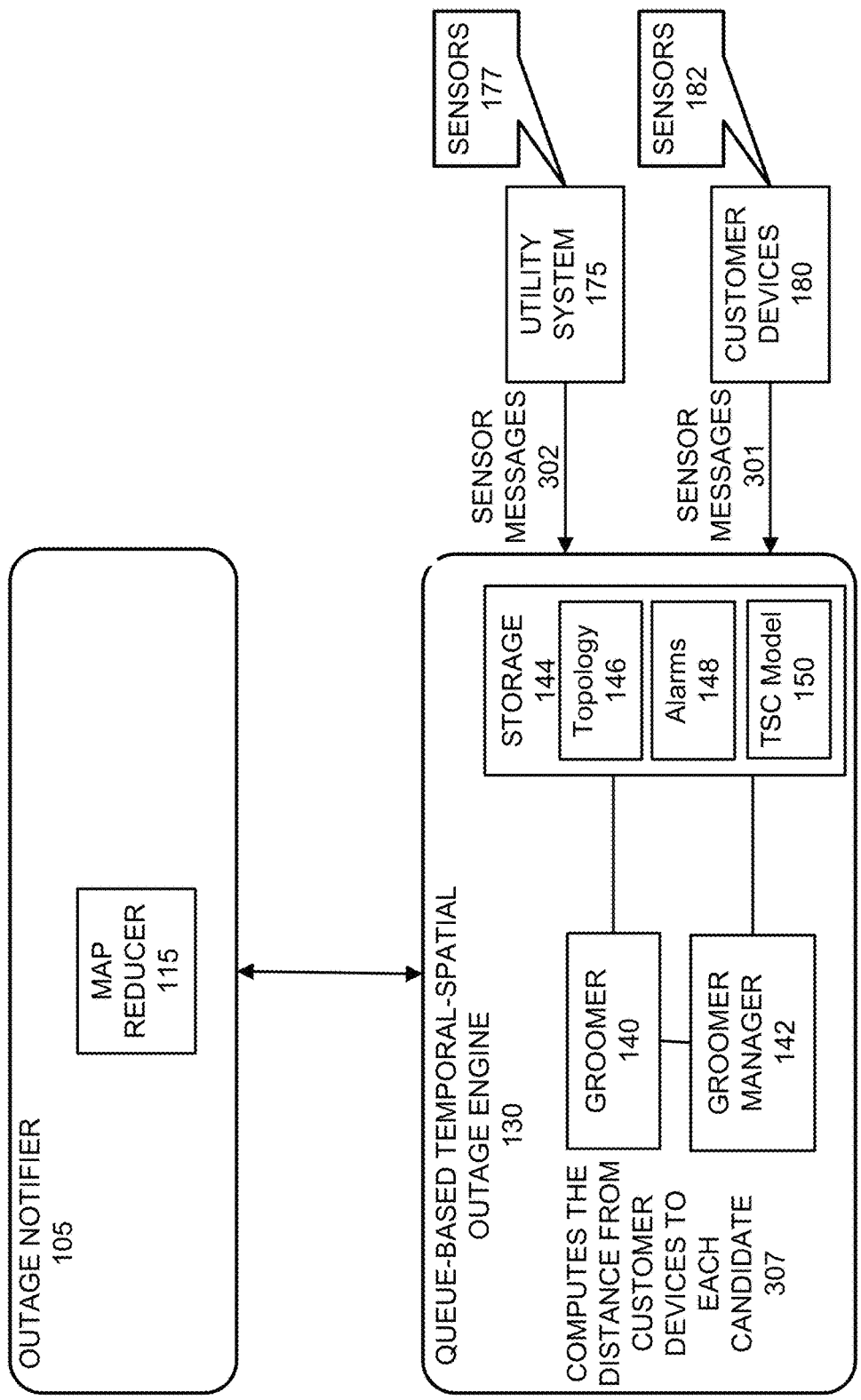

Referring to FIG. 3B, groomer 140 may compute the distance from each customer device 180 to each candidate element 307 of utility system 175. For example, based on the location data associated with each customer device 180 and elements of utility system 175, groomer 140 determines the distances between these two entities. According to an exemplary implementation, groomer 140 sorts the customer devices 180 based on their respective distances (e.g., from shortest to farthest) relative to the candidate elements/circuits of utility system 175.

Figure 3C:
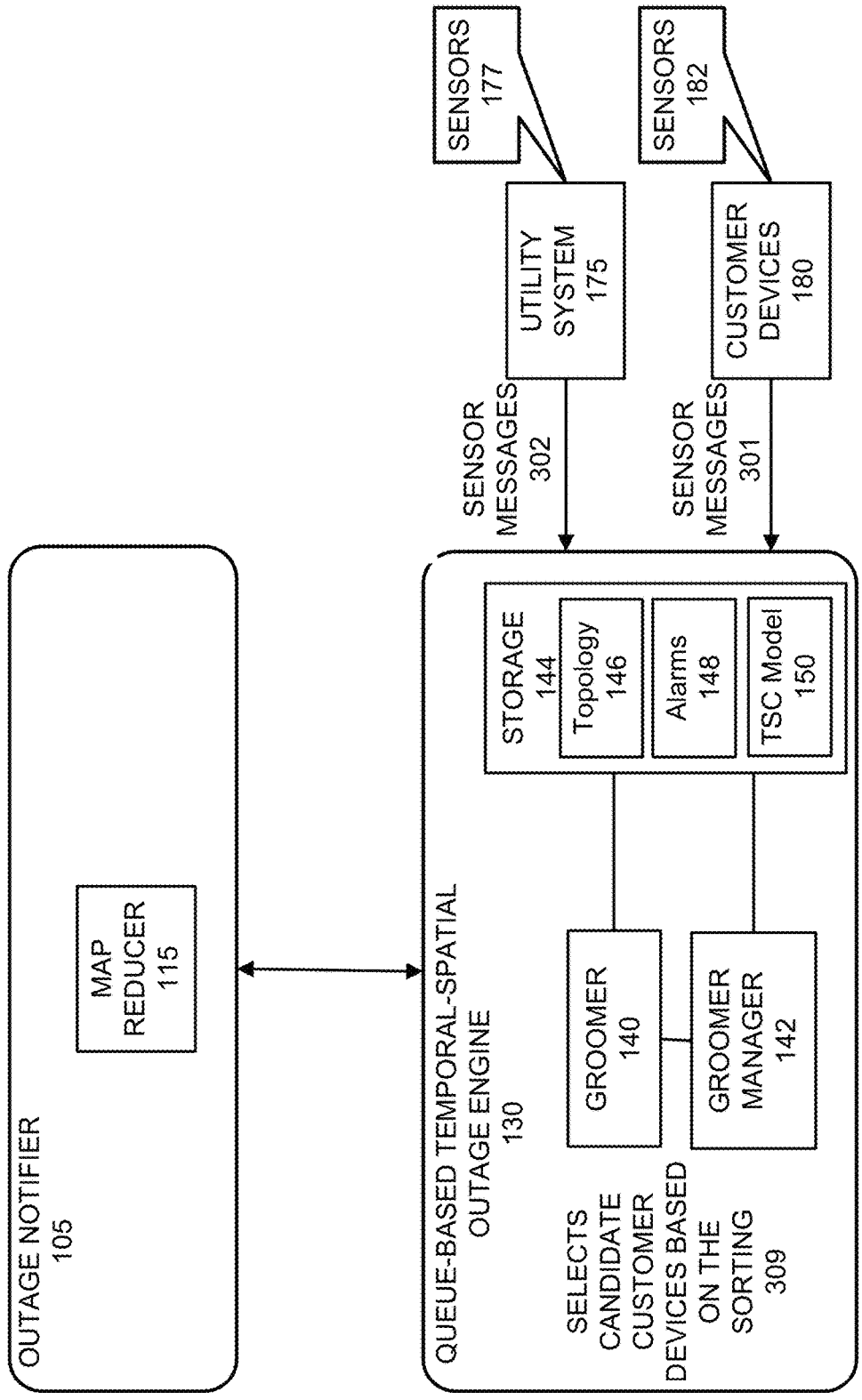

Referring to FIG. 3C, groomer 140 selects candidate customer devices 180 based on the sorting 309. According to an exemplary implementation, groomer 140 selects a portion of customer devices 180 that are closest to the candidate elements/circuit of utility system 175. The number of customer devices 180 selected may be preconfigured. Groomer 140 may also consider other factors when selecting, such as the times customer devices 180 indicated the loss of power.

Figure 3D:
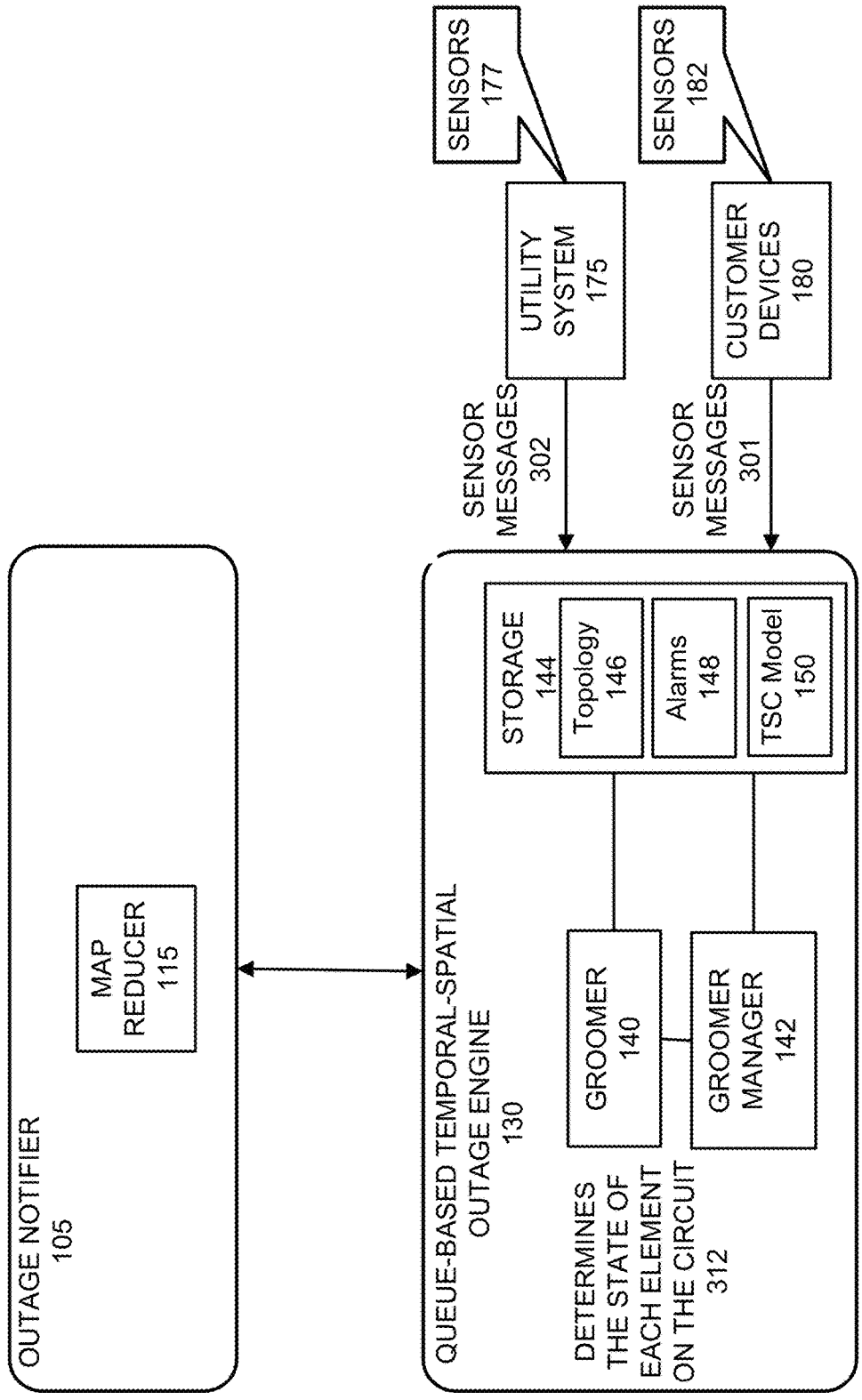
Figure 4:
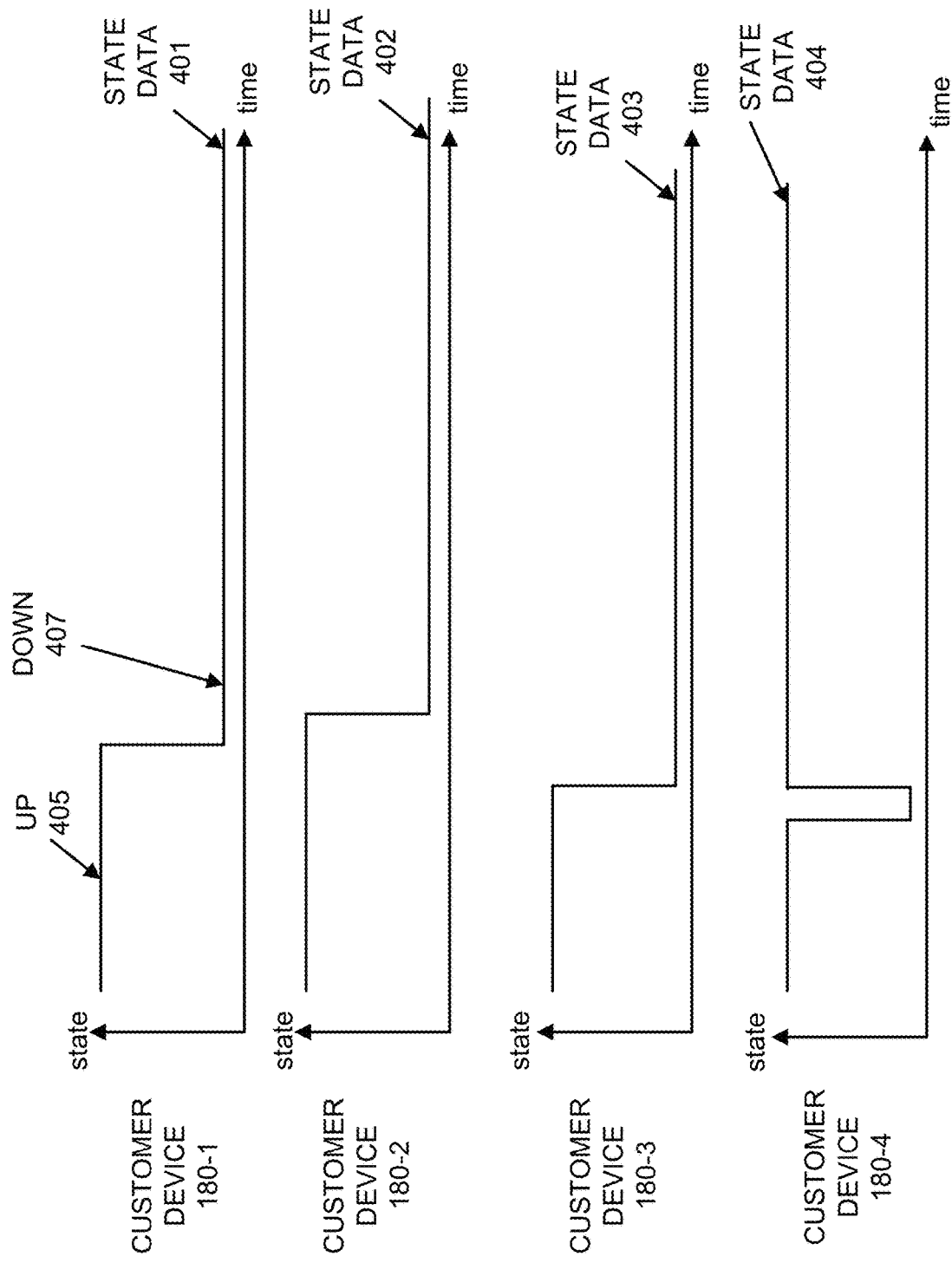
FIG. 4 is a diagram illustrating an exemplary representation of state data for customer devices.

Referring to FIG. 3D, groomer 140 determines the state of each candidate element on the circuit 312. For example, in FIG. 4, assume that groomer 140 is evaluating customer devices 180-1, 180-2, 180-3, and 180-4, subsequent to the selection process. As illustrated, state data 401, 402, 403, 404 may have an "UP" state 405 or a "DOWN" state 407 during any instance of time. The state data of customer devices 180-1 through 180-4 are also associated with different spatial data (e.g., location). According to an exemplary embodiment, the state data for customer device 180 is assigned a weighted value. According to an exemplary implementation, the weighted value may be a 1 or a 0. For example, customer device 180-4 may be assigned a weighted value of 0 when groomer 140 determines that the customer may have a power backup system that is supplying electricity to customer device 180-4 during a time window under analysis. As an example, groomer 140 may assume the presence of the power backup system based on the signature of state data 404 relative to the state data of customer devices 180-1, 180-2, 180-3, which is indicative of a down status during the time window. According to another example, the particular customer device 180 may be assigned a weighted value of 0 when historical state data received from the particular customer device 180 indicates that the state data is unreliable. As an example, the state data may indicate values that are erratic (e.g., fluctuating frequently) and/or state data that is not in harmony with state data of other customer devices 180 that are known or assumed to be on the same circuit. Otherwise, a customer device 180 may be assigned a weighted value of 1.

According to this example, assume that candidate devices 180-1, 180-2, and 180-3 are assigned a weighted value of 1, while customer device 180-4 is assigned a weighted value of 0. As historical state data is gathered over time, the assumption regarding the presence of the power backup system may be reinforced.

Based on the weighted values, groomer 140 may calculate an outage value. For example, the outage value may be calculated based on the exemplary expression:

$$\text{Outage value} = \Sigma_i^N \text{statevalue} \ast \text{weight}_i / N \tag{1},$$

in which each state value of a selected time instance is multiplied by its corresponding weight, all of the products are summed, and the summation is averaged. Groomer 140 may compare the outage value to a threshold outage value to determine the state of the circuit. For example, according to this example, when the outage value is equal to or greater than the threshold outage value, then groomer 140 may determine that the circuit is down. Otherwise, groomer 140 may determine that the circuit is up. According to this example, groomer 140 may determine that the circuit is down.

Figure 3E:
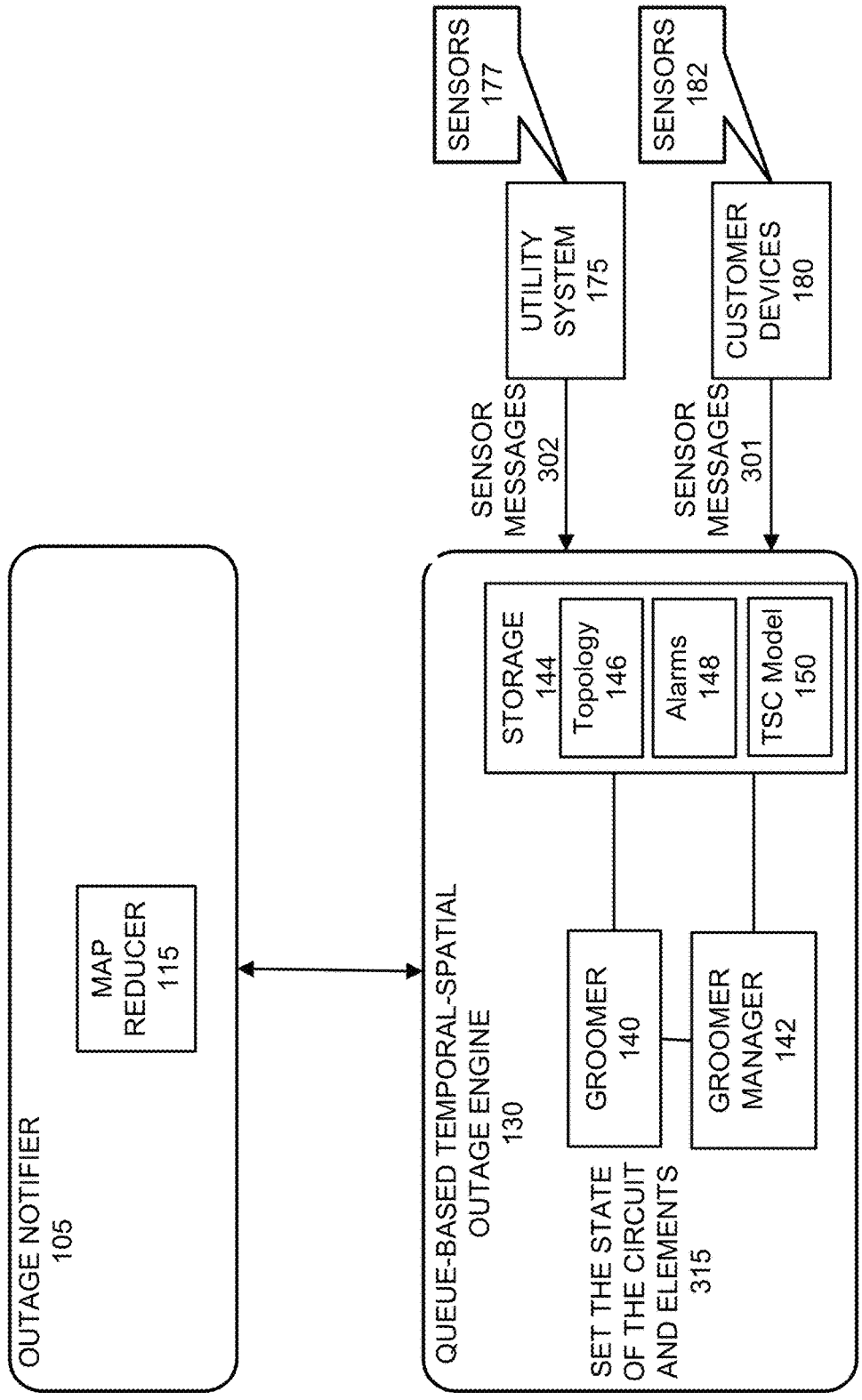
Figure 5:
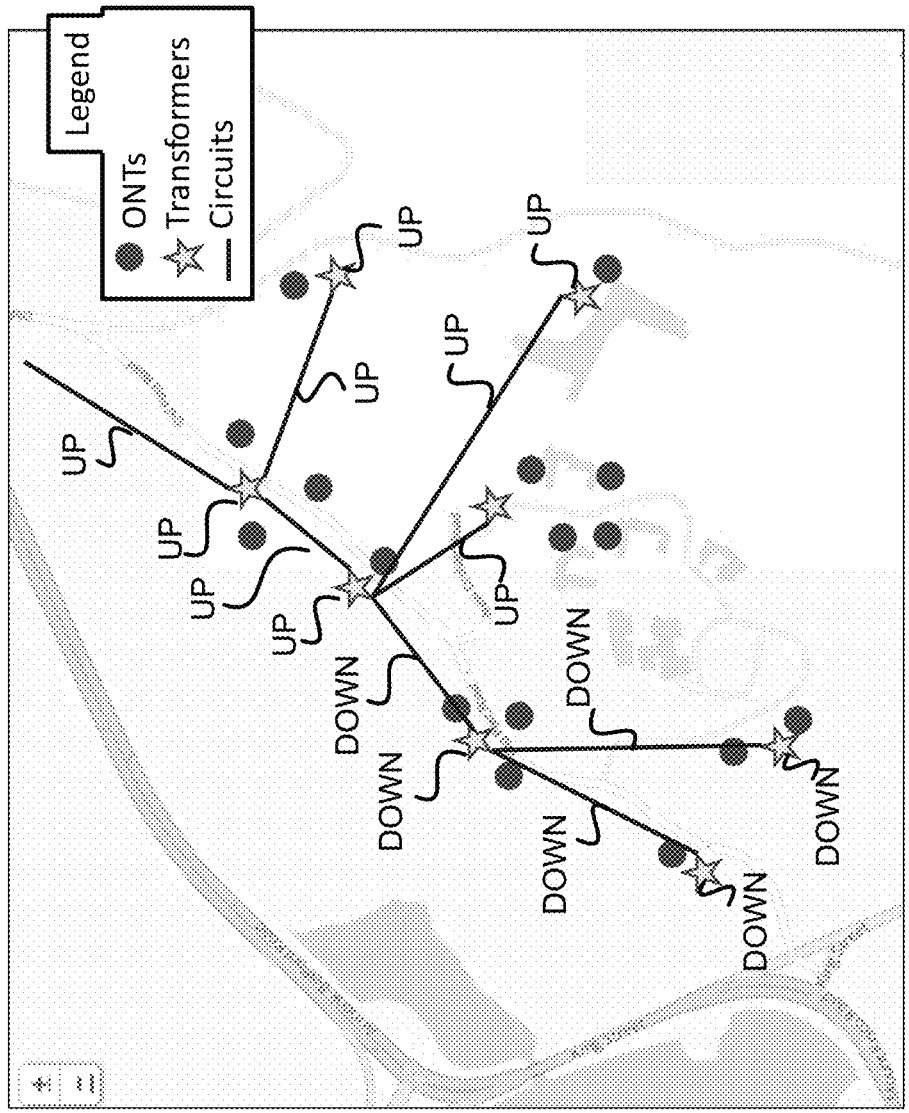
FIG. 5 is a diagram illustrating exemplary elements of a utility environment and their exemplary states.

Referring to FIG. 3E, based on the result of the outage value calculation and comparison, groomer 140 may set the state of the circuit and elements 315. For example, groomer 140 may set the state of the circuit and elements (e.g., transformer, secondary lines, poles) as down when the outage value is equal to or greater than the threshold outage value. As an example, as illustrated in FIG. 5, certain transformers (indicating as stars) and circuit (indicated as lines) may be considered down relative to customer devices, such as ONTs (indicated as circles).

Figure 3F:
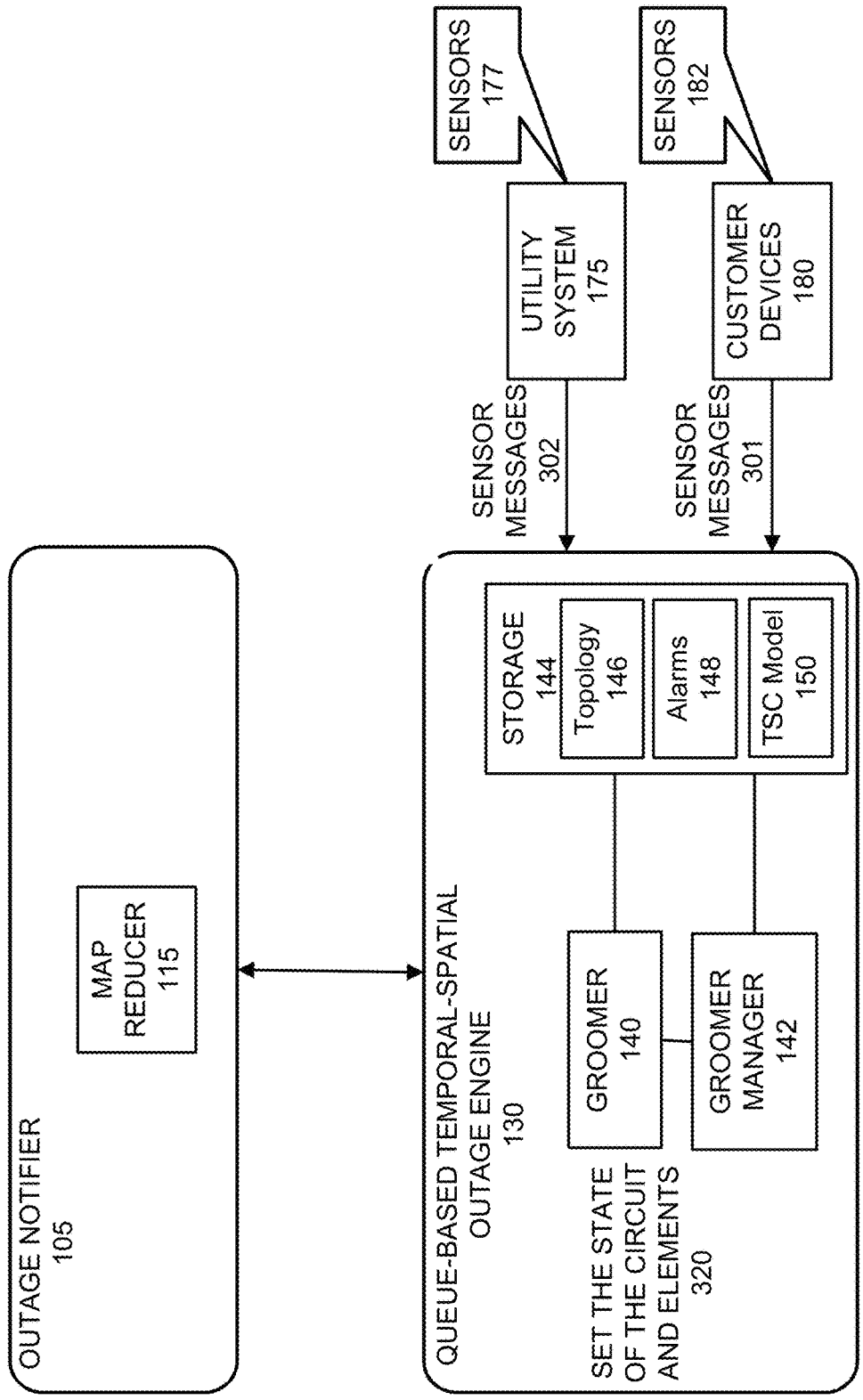

Referring to FIG. 3F, as time progresses and remedial measures are implemented to restore the electric service, sensor messages 301 and 302 may begin to indicate that elements, circuits, and customer device 180 are up. In a manner similar to that just described, groomer 140 may set the state of the circuit and elements 320.

Figure 6:
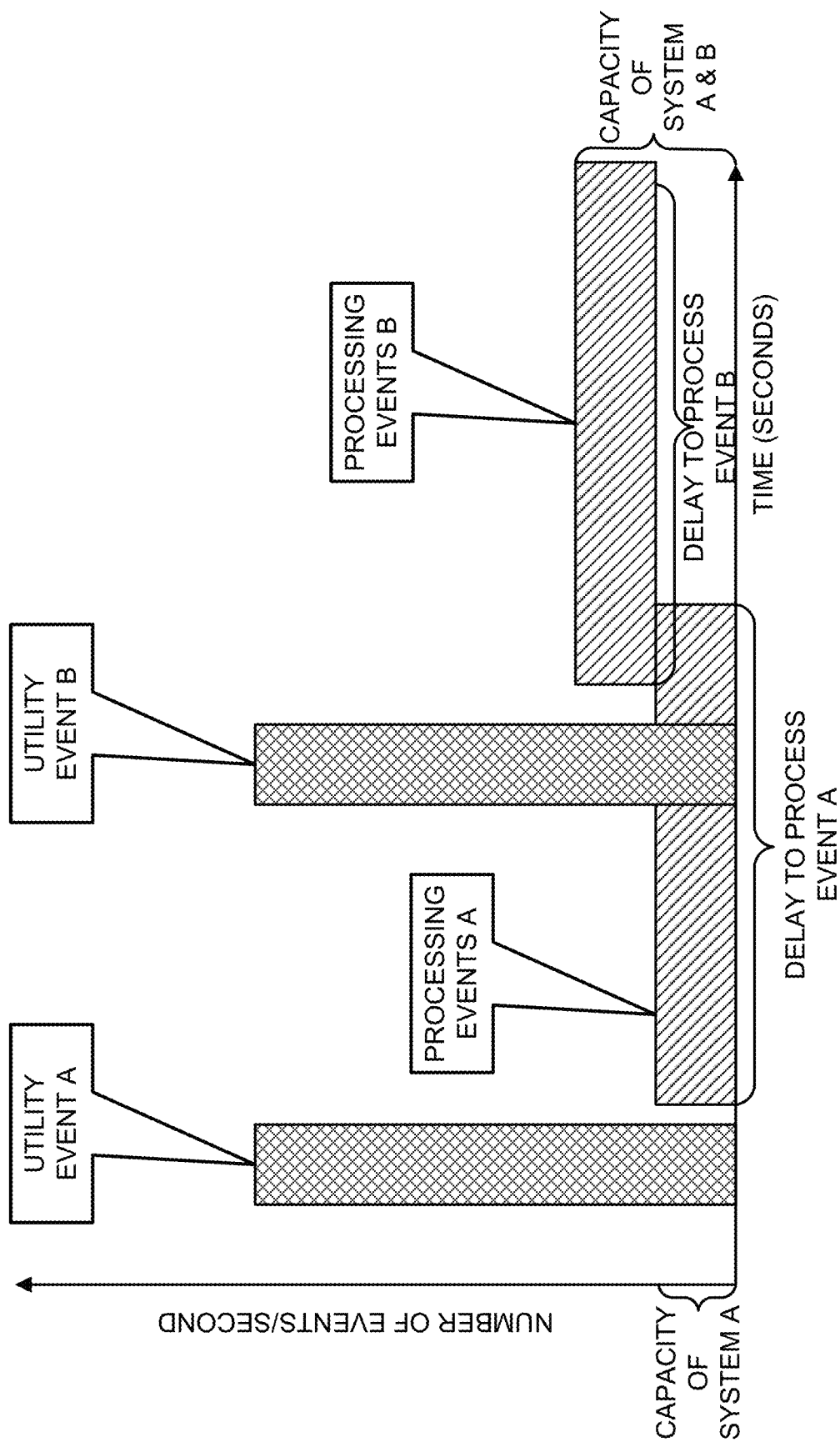
FIG. 6 is a diagram illustrating another exemplary process of the predictive outage service.

FIG. 6 is a diagram illustrating another exemplary process of the predictive outage service. As illustrated, as a utility event A occurs and sensor messages are received and processed by QB-TS outage engine 130 and outage notifier 105, the predictive outage system allots a time window (e.g., delay to process event A) to allow for the receipt of sensor messages stemming from an event (e.g., a failure event) and subsequent processing to determine the state of elements/circuits of utility system 175. Grooming manager 142 may manage this grooming time parameter, which is configurable and may be dynamic depending on the number of events that happen within a certain time window. As illustrated, in some cases, another utility event (e.g., utility event B) may occur (e.g., in a different geographic region than utility event A) before the time window pertaining to utility event A expires. As a result, grooming manager 142 may increase the capacity of the predictive outage system to match the required capacity of the incoming sensor messages/events.

Figure 7A:
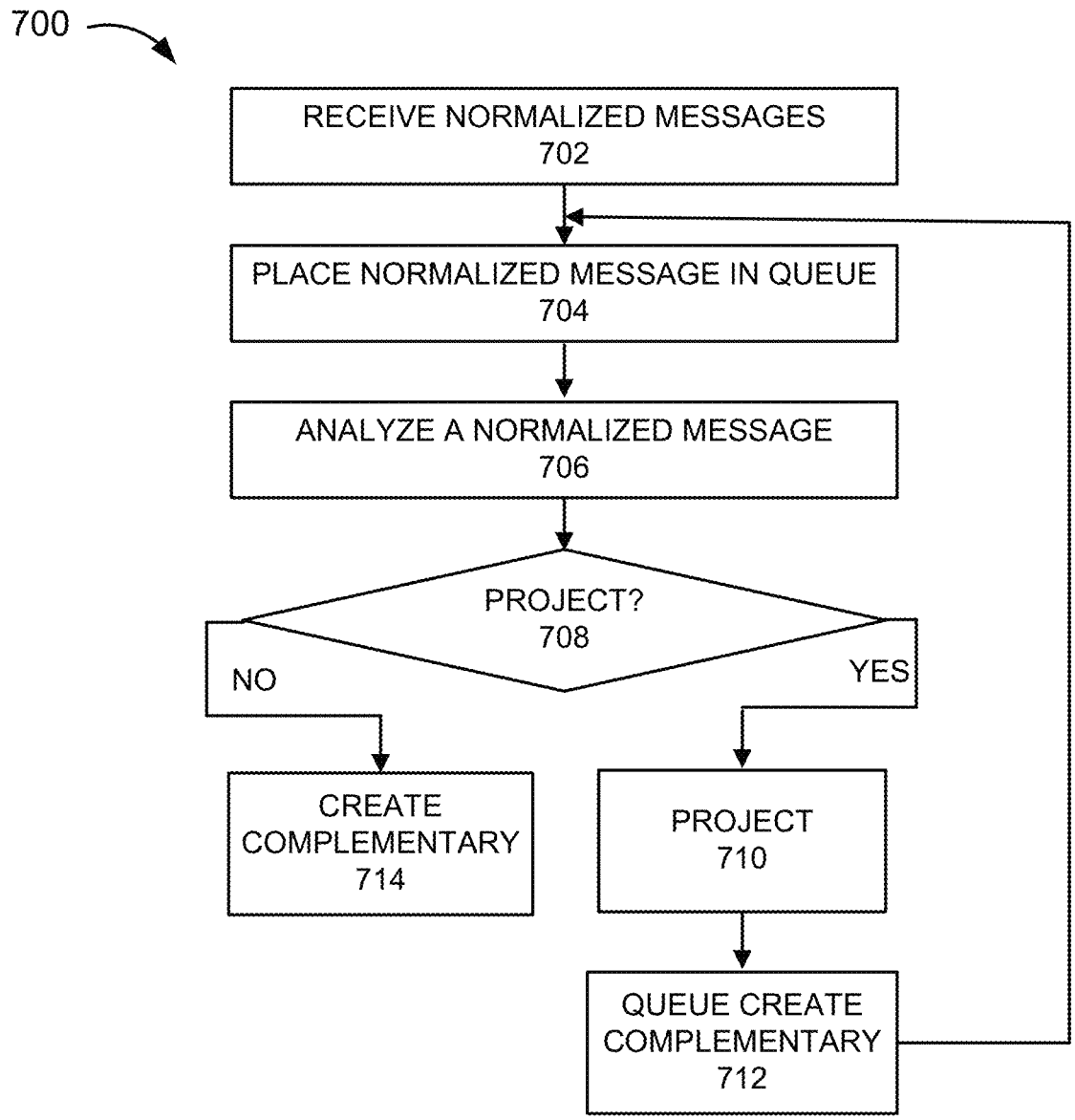
FIG. 7A is a diagram illustrating yet another exemplary process of the predictive outage service.
Figure 7B:
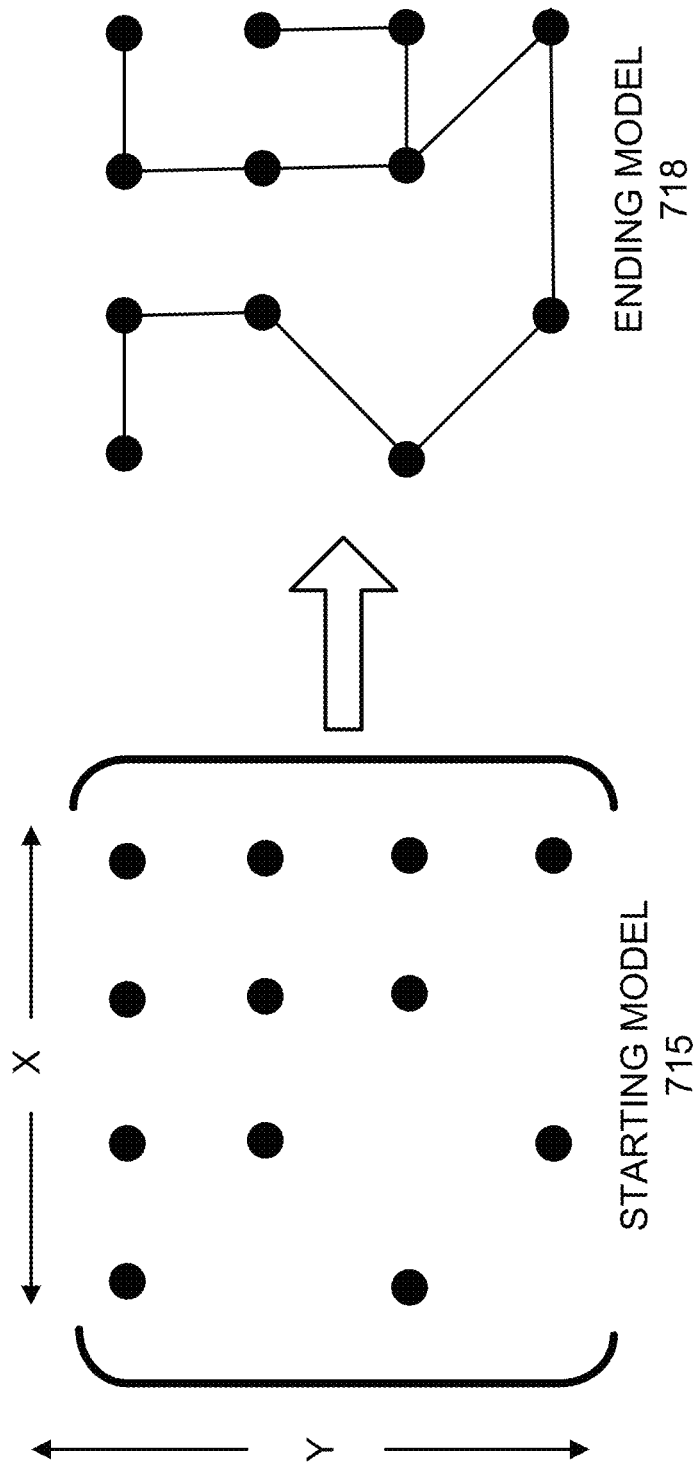
FIG. 7B is a diagram illustrating exemplary models pertaining to a temporal-spatial cluster (TSC) model.

FIG. 7A is a flow diagram illustrating yet another exemplary process 700 of the predictive outage service. As previously described, groomer 140 may expand the search of elements/circuits related to events that occur. Additionally, despite the learning and the building of the topology of elements/circuits of utility system 175 (e.g., as stored in topology 146), QB-TS outage engine 130 may not have information relating to the direction of flow of electricity from one element to the next element and/or the direction of flow of electricity in a circuit. According to an exemplary implementation, process 700 may be performed within a time window allocated for starting and stopping the grooming service for a particular event (e.g., the grooming time parameter).

Figure 8A:
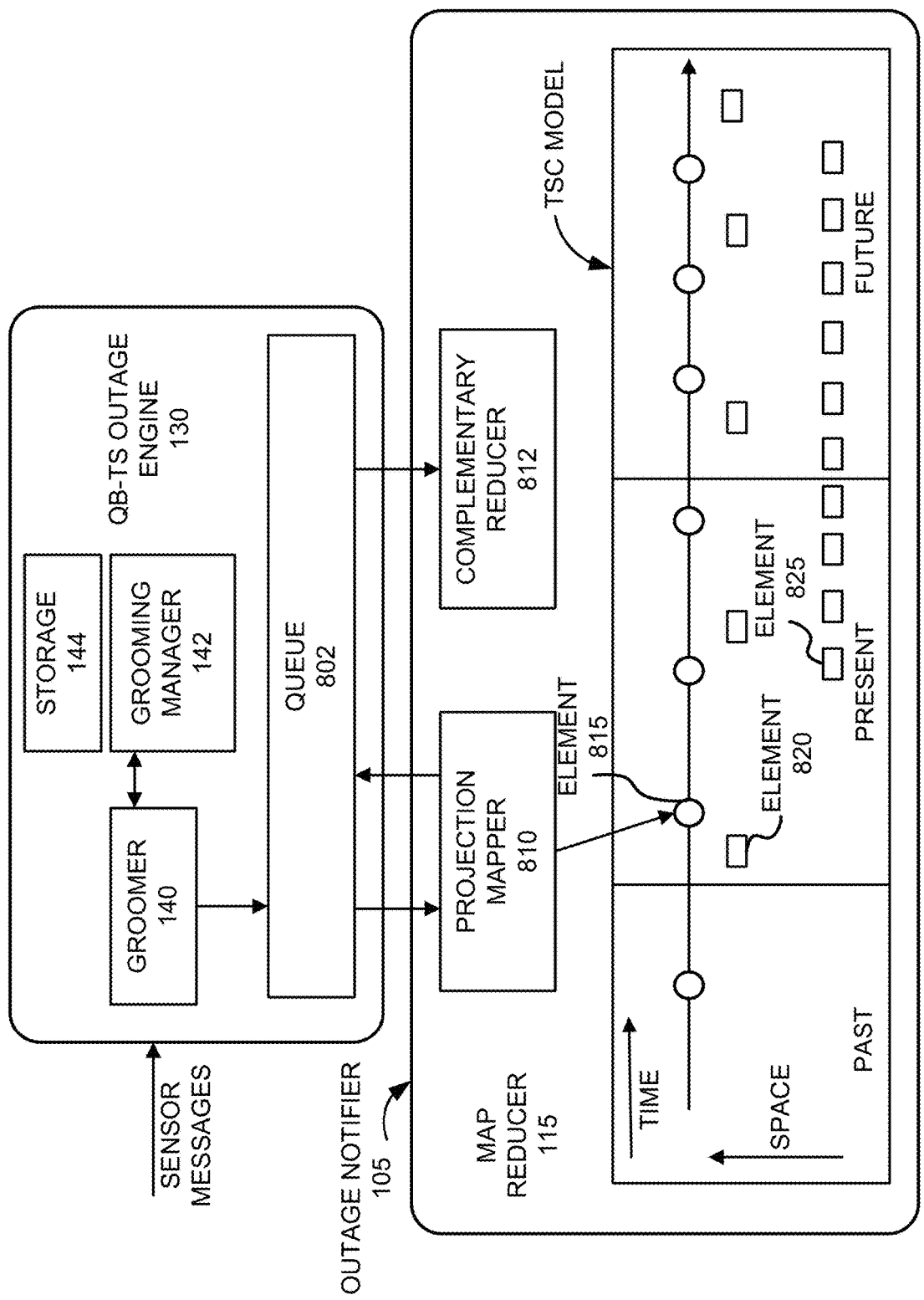
FIGS. 8A and 8B are diagrams illustrating exemplary process of the mapping and reducing functions of the grooming service.

As illustrated, in block 702, normalized messages are received, and in block 704, the normalized messages are placed in a queue. For example, as previously described, QB-TS outage engine 130 may receive from sensors 182 sensor messages that include sensor data. QB-TS outage engine 130 may normalize the incoming sensor messages and place the normalized messages in a queue. For example, referring to FIG. 8A, the normalized messages may be stored in a queue 802. The normalized messages may also be stored in alarms 148 of storage system 144.

Referring back to FIG. 7A, in block 706, a normalize message is analyzed. For example, groomer 140 may analyze a normalized message from the queue. In block 708, it is determined whether to map the sensor data or create a complementary outage based on a mapping function. For example, groomer 140 may determine whether to map the sensor data in the TSC model via map reducer 115 based on whether an outage has already been determined to exist for customer device 180.

When it is determined that an outage is not already determined (block 708—YES), the sensor data is projected in the TSC model via map reducer (block 710). For example, groomer 140 maps the temporal, spatial, and failure data included in the sensor data to the TSC model. By way of further example, referring to FIG. 8A, for illustrative purposes, circles and squares in the TSC model may represent different types of elements in utility system 175. A projection mapper 810 of map reducer 115 may map the outage of customer device 180 to an element 815 in the TSC model.

Figure 8B:
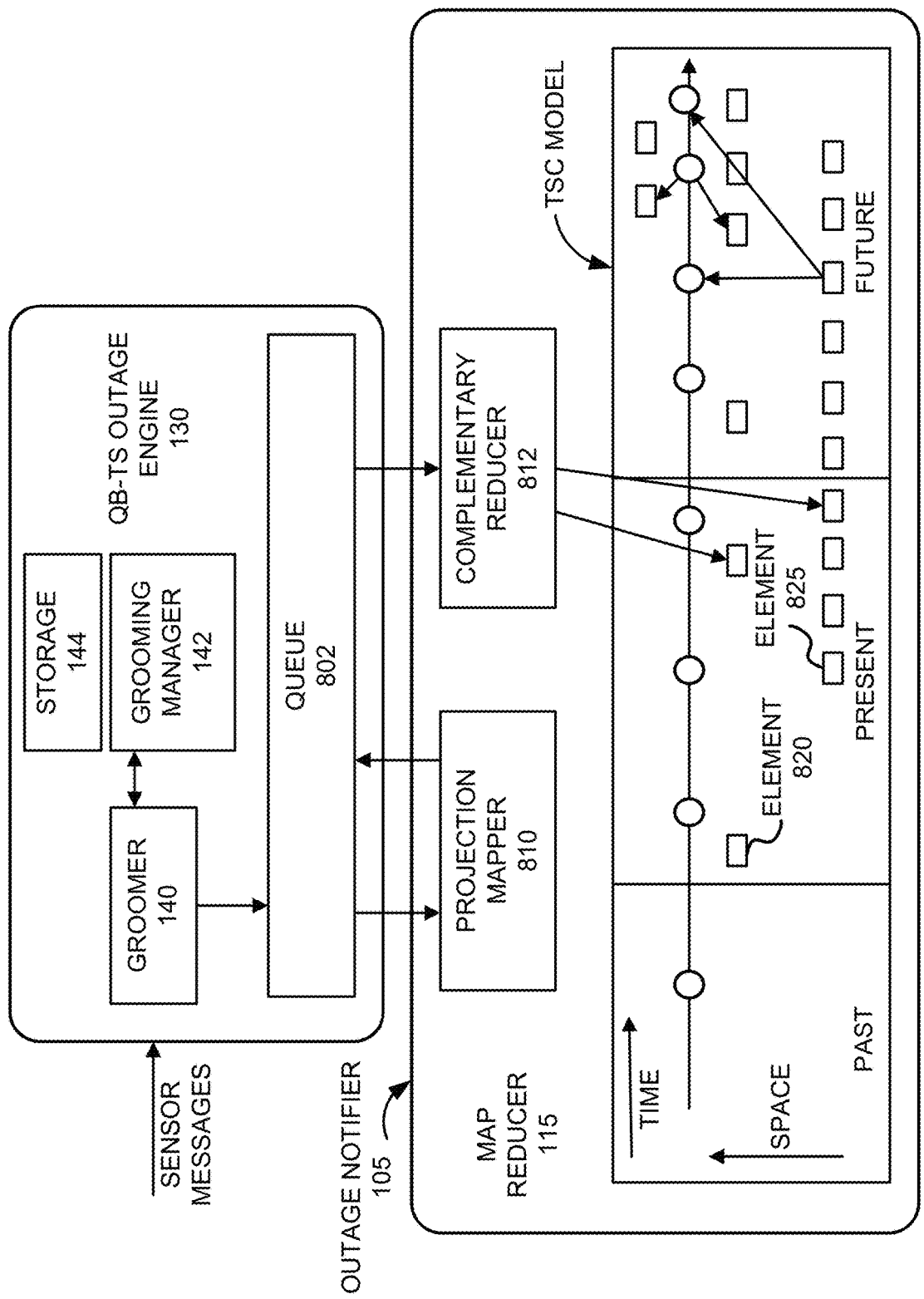

Referring back to FIG. 7A, in block 712, a creation of a complementary outage is queued. For example, groomer 140 generates a message to be placed in queue 802. When the message is analyzed, groomer 140 may cause a complementary reducer 812 to calculate an outage for elements that are upstream and/or downstream from customer device 180 to which the normalized message pertains, as described further below. As illustrated, the message may be placed in the queue (block 704) and analyzed (block 706). In block 708 it is determined whether to map the sensor data or create a complementary outage based on a mapping function. In this instance, based on the analyzed message (block 708-NO), a complementary outage is created (block 714). For example, referring to FIG. 8B, groomer 140 may identify other elements (e.g., elements 820 and 825) that are geographically near element 815 and determine the state of these other elements. Additionally or alternatively, groomer 140 may identify other customer devices 180 that are geographically near customer device 180 to which the normalized message pertains. For example, groomer 140 may perform a lookup in storage 144 (e.g., topology 146 and alarms 148). Depending on the state of the other elements and/or other customer devices 180, groomer 140 may correlate the other elements with element 815 pertaining to various facets of utility system 175, such as connection between elements, direction of flow of electricity, configuration of a circuit, etc. In this way, utility system 175 may be represented as a nodal admittance matrix for which various closed form solutions may exist to determine the "cutsets" for the various topologies.

Although FIG. 7A illustrates an exemplary process 700 of the predictive outage service, according to other embodiments, process 700 may include additional operations, fewer operations, and/or different operations than those illustrated in FIG. 7A, and described herein. For example, when the time period indicated by the grooming time parameter expires, complementary reducer 812 may update the TSC model and store the updates in TSC model 150 of storage system 144.

It is desirable to construct a representation of the dependencies of variables in the system that may affect the utility system in order to predict the likelihood of an outage. This includes connectivity between assets (e.g., power lines), relationships between trees, vegetation proximity to water, and/or other physical or environment element that may influence the operation of the utility system. When these relationships are established, an outage event or other adverse variable condition can be used to determine the likelihood of a knock-on event of one or more of the remaining assets in the utility system.

A method for developing this model is to use historical outage events as input to a Markov Cluster Algorithm and blindly develop and refine a cause and effect cluster model which is described herein as the TSC model. For example, referring to FIG. 7B, a starting graph model 715 and an ending graph model 718 are represented. Ending graph model 718 results from running the TSC model algorithm. For example, ending graph model 718 includes clusters of dependencies. To build this model, the system starts off with a limited knowledge of the dependencies within the utility system. A starting relationship among elements of the utility system may be constructed by assuming elements in close proximity of each other are somehow connected. From this starting point along with using historical events from outages and weather information, ending graph model 718 may be derived. The dependencies of parameters of the system within the assets are unknown. A node in a model may represent perhaps an asset while the edges, connecting the nodes, may represent feeder circuits that deliver power between the nodes. The TSC model may be extended to include nodes that represent trees, earthquake events and so on. Thus, the state of each node may represent whether a tree has fallen, or an earthquake has occurred and so on. Instead of a node being ON or OFF, the graph model represents the likelihood level of the state of that event.

The edges represent the likelihood of the sequence of events effecting downstream events. So a line (edge) connecting one node to the next is the likelihood of the "downstream" node being affected by the "upstream" node. This is considered a Markov Model and represents a chain of events that may or may not happen for any given scenario. The predictive outage system described herein may build that model using historical events, as described herein. By means of an example, consider starting model 715. The predictive outage system may start with data indicating the approximate geographic relationship between assets and the geographic relationship between assets and other elements external to the utility system (trees, rivers, etc.). The predictive outage system may begin with the assumption that nodes located within proximity of each other are slightly likely to affect each other. So any asset or element that is at a given X and Y location (e.g., latitude, longitude) may be represented as having a dependency on its neighbor.

Figure 7C:
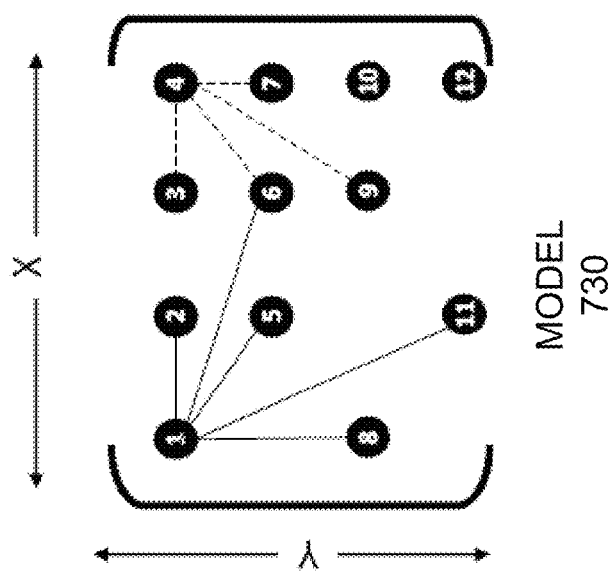
FIG. 7C is a diagram illustrating an exemplary model and matrices pertaining to the TSC model.

Referring to FIG. 7C, a matrix $A_c$ (referred to as the connectivity matrix or the associated matrix) represents the connectivity of the nodes illustrated in a model 730. In this example, only the 1$^{st}$ node (row 1) and the 4$^{th}$ node (row 4) have been filled out in the $A_c$ matrix. In practice, the remaining nodes of model 730 would all have the proper starting connectivity and represented in the $A_c$ matrix with values of 1 whenever there are nodes that connect to each other with an edge. Thus, row 1 of the matrix $A_c$ corresponds to node 1 in model 730 in which node 1 is connected to nodes 2, 5, 8, and 11. Similarly, row 4 of the matrix $A_c$ corresponds to node 4 in model 730, in which node 4 is connected to nodes 3, 6, 7, and 9. Further, the matrix $A_c$ represents a relationship between neighboring nodes. For example, $A_c[1,2]=1$ means that the next state of node 2 is dependent on the current state of node 1. That is, because the nodes shown in model 730 are geographically proximate to each other and may be connected, then there is some dependency on the state of the neighboring nodes.

In matrix $A_d$, a diagonal entry is added to indicate that the next state of a current node is somewhat dependent on the current state of the current node. At this point, the Markov Cluster Algorithm may be used to determine the clustering of nodes within the system. However, because the initial dependencies of the nodes may be speculative or guesses, the Markov Cluster Algorithm may not initially produce useful information that is representative of the actual system, and numerous iterations may be performed. However, as described herein, the connectivity of the nodes may be refined and augmented based on outage events that occur and the change of states that occur at the nodes. The Markov Cluster Algorithm (also known as the MCL algorithm) is based on the PhD thesis "Graph Clustering by Flow Simulation" by Stijn van Dongen, which is incorporated by reference in its entirety.

Observed outage events may be used to augment the $A_d$ matrix to include observations of outages. For example, this may be done be observing any event that causes an outage and adding an increased count to the edges of all nodes that were involved in the outage. Note that the term "outage" is used, but any affect that causes a change in the state of the system may be counted in this process. For example, one of the nodes in model 730 may represent a "clump of trees" that may have blown down in a storm. In that case, any nodes that were affected by that clump of trees that caused an observed outage event will have an increment to the model of those nodes that are involved in the outage event. By way of further example, if an outage occurs (e.g., simultaneously or substantially simultaneously) at nodes 1 and 2, then the first row of the $A_c$ matrix may be incremented such that $A_c[1,2]=2$ and, in the second row of the $A_c$ matrix, $A_c[2,1]=2$. However, in the first row, $A_c[1,5]$, $A_c[1,6]$, $A_c[1,8]$, and $A_c[1,11]$ may maintain a value of 1. In this regards, the connectivity between nodes 1 and 2 becomes more weighted. As more outages occur and nodes are correlated in terms of connectivity, the matrix may become more representative of the actual system. In this regard, the nodes in model 730 and the matrices (e.g., $A_c$, $A_d$) may represent an element of the utility system (e.g., a transformer, a generator, a pole, etc.) or an element not of the utility system (e.g., a parameter of weather, a river, a tree, etc.). In turn, the connectivity (or lines) between nodes may represent, for example, the flow of electricity or the causal effect of one node to another (e.g., an overflowing river to a generator, etc.).

The resulting matrix after augmentation is then normalized to create a Markov Chain Cluster Matrix which is then run through the Markov Cluster Algorithm. The clusters produce groups of clusters that will be observed as non-zero rows in the converged associative matrix after Markov Cluster convergence. These are interpreted as attractors. The resulting set of attractors may be used as the TSC model which may then be used to determine statistical dependencies for predicted event outcomes for given input conditions. For example, if a storm with high winds is expected (forecasted alarms) to impact a given region, then the TSC model may be multiplied by the likelihood of each event (forecasted alarms) hitting each of the "clump of trees" node in the TSC model. As a result, a full set of predicted failed nodes (power outages) across the region may be calculated.

The TSC model is continuously updated as more alarms are observed. Some sections of the utility grid may never be "discovered" because there are never any failures within that section of the utility grid and correspondingly such sections may not enter into the final TSC model. The predictive output from the predictive outage system, which is based on the TSC model, may hide the actual connectivity of the utility grid because the predictive outage system may be trained to where there is no dependency on the upstream or downstream power flow versus not on the weather or other conditions. In other words, the TSC model may be trained to ignore physical connectivity in those places that never affect each other.

In general, the size of the associative matrix may be quite large. The 12-node system illustrated in FIG. 7C is represented by $12^2$ entries (144 entries). However, for example, a network of 10 million customers, the size of the associated matrix is $10^{12}$ entries, which may become too large for the predictive outage system (e.g., groomer 140, etc.). Thus, in practice, groomer 140 may make multiple copies of the TSC model, and spread them around to each map reducer 115 for analysis and updates in those components. This may be manage by segmenting the TSC model and storing the model internally in the predictive outage system as several sequences of time stages and disconnected regions. This facilitates the operation of the Markov Clustering Algorithm and the predictive use of the model simultaneously across several mapper nodes and across several time spans. The reducer portion of the map reducer is used to update neighboring models with edges that share common nodes within each segmented TSC model component.

Figure 9:
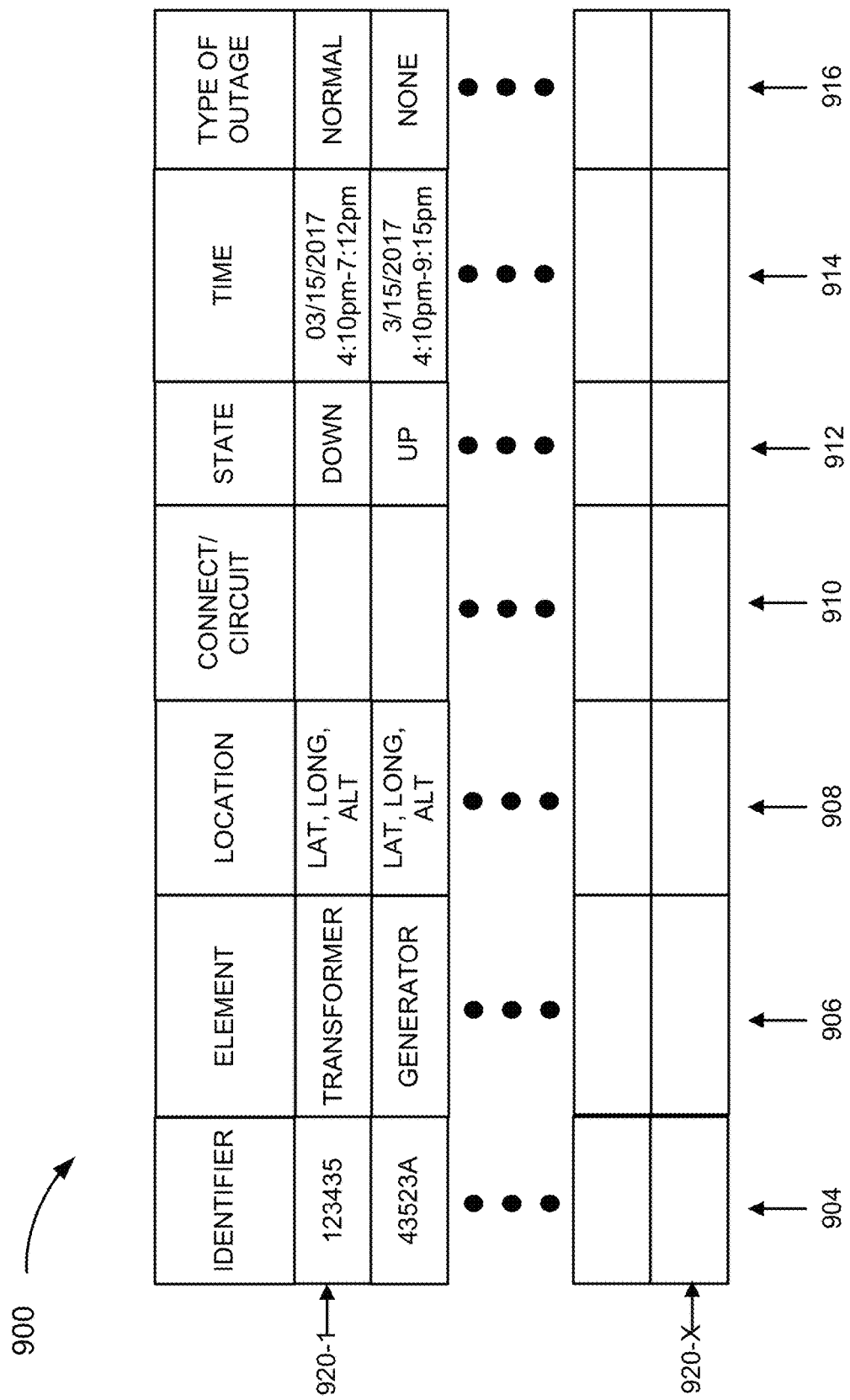
FIG. 9 is a diagram illustrating exemplary data of a TSC model.

FIG. 9 is a diagram illustrating exemplary data of a TSC model. For example, the exemplary data is illustrated in a table 900 that includes an identifier field 904, a type of element field 906, a location field 908, a connection/circuit field 910, a state field 912, a time field 914, and a type of outage field 916. As further illustrated, table 900 includes records 920-1 through 920-X that each includes a grouping of fields 904 through 916 that may be correlated. The type of data and the values of the data illustrated are exemplary. The data of the TSC model is illustrated in tabular form merely for the sake of description. The TSC model and corresponding data may be implemented in a data structure different from a table.

Identifier field 904 stores data that identifies an element of the utility system. For example, identifier field 904 may store a globally unique string that includes number and/or letters. Type of element field 906 stores data that indicates a type of element of the utility system. For example, type of element field 906 may store data that indicates a transformer, a generator, a voltage regulator, a line termination device, a primary feeder, a secondary feeder, a pole, or other element in the utility system.

Location field 908 stores data that indicates a location of the element. For example, location field 908 may store data that indicates a geographic coordinate, such as latitude, longitude, and altitude.

Connection/Circuit field 910 stores data that indicates other element(s) to which the element is connected, a circuit to which the element belongs, a direction of flow of electricity via the element, configuration of the element (e.g., which may be time-dependent), and/or attributes of the element relative to a hierarchy of the utility system (e.g., primary, secondary, etc.).

State field 912 stores data that indicates a state of the element of the utility system in relation to time field 914. For example, state field 912 may store data that indicates an up state, a down state, or some other power condition (e.g., erroneous, etc.). Time field 914 stores data that indicates a period of time during which the element was in the state indicated by state field 912. For example, time field 914 may store date and time data.

Figure 10A:
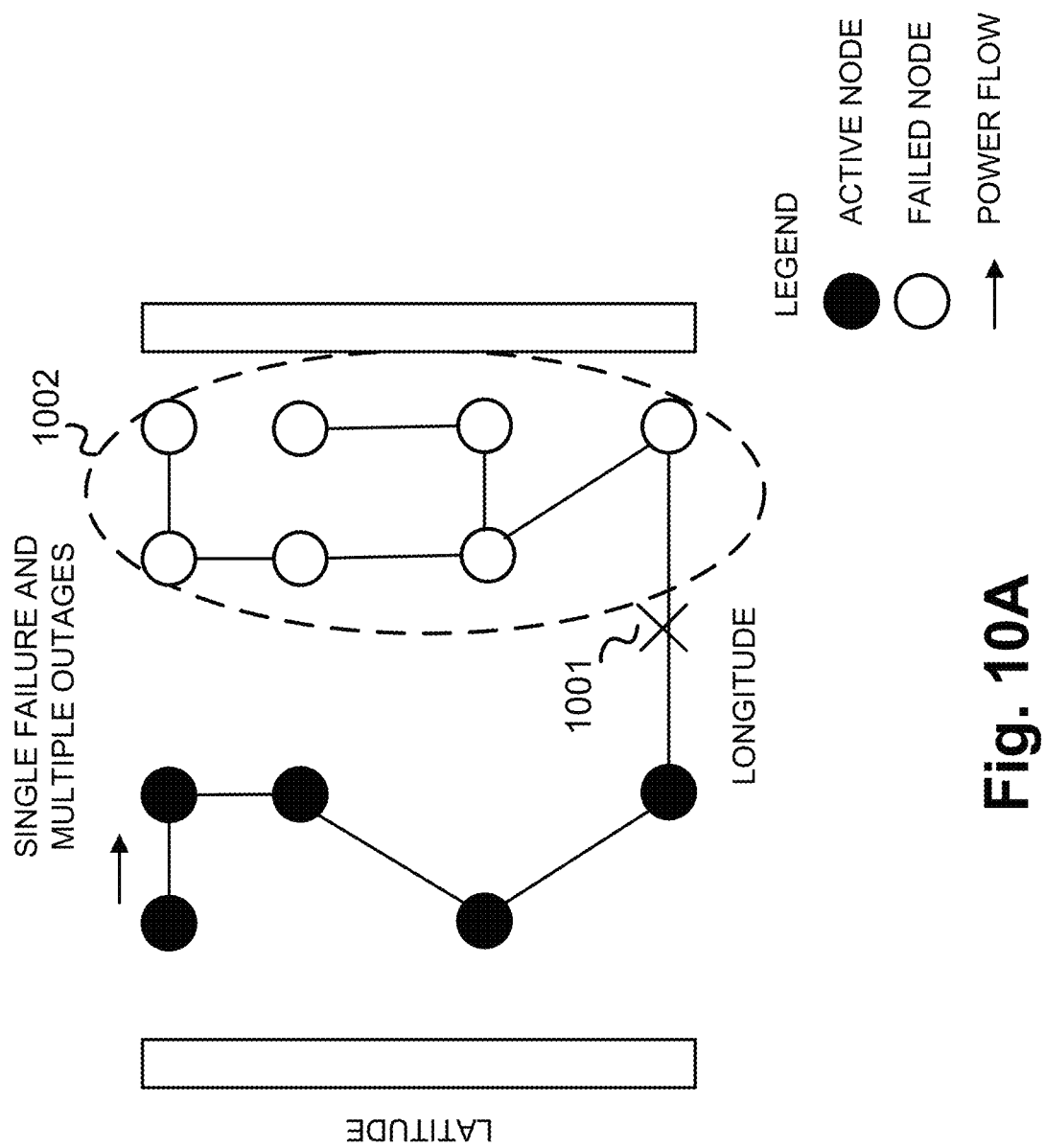
FIGS. 10A-10E are diagrams illustrating exemplary failures and outages.
Figure 10B:
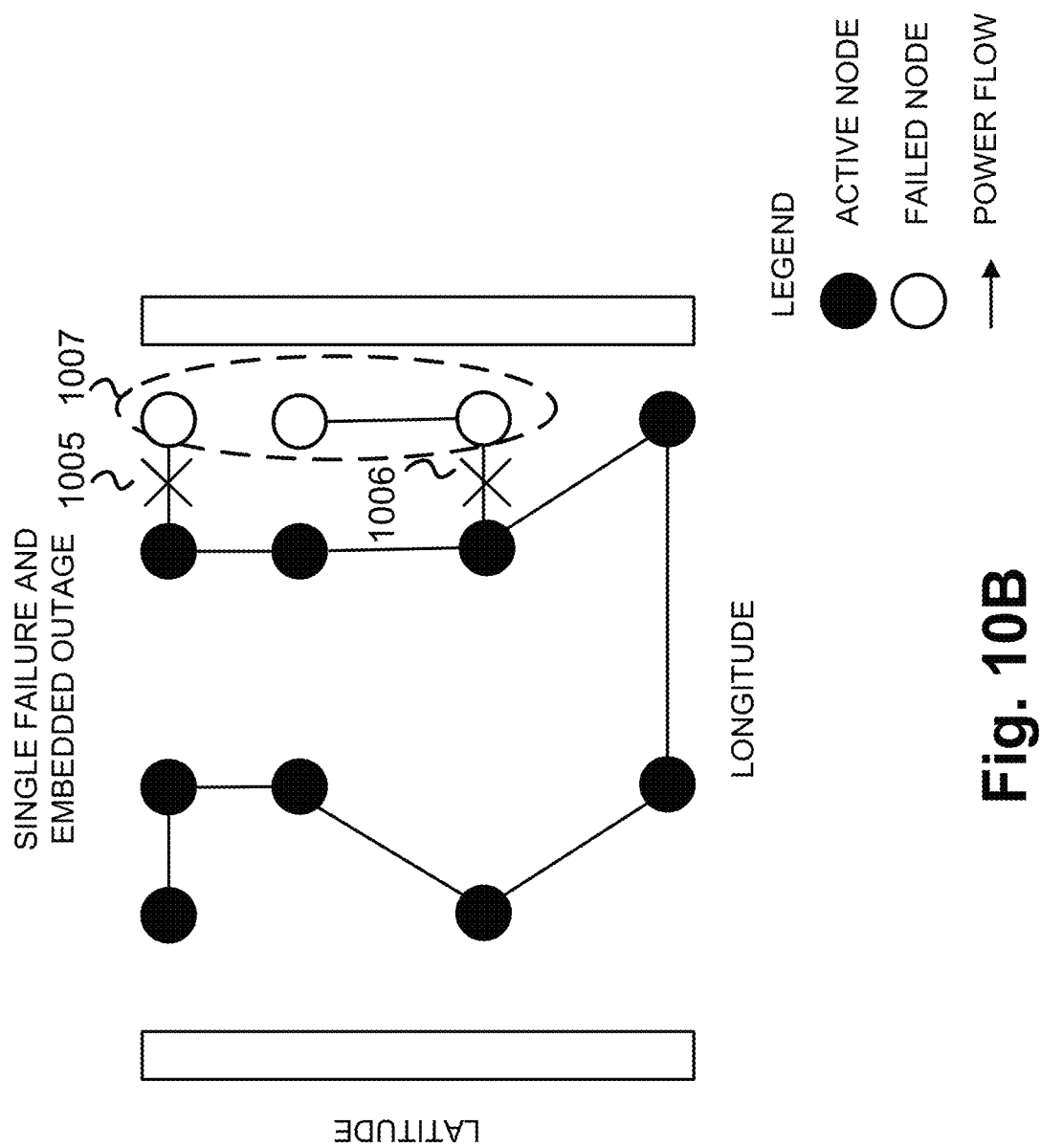
Figure 10C:
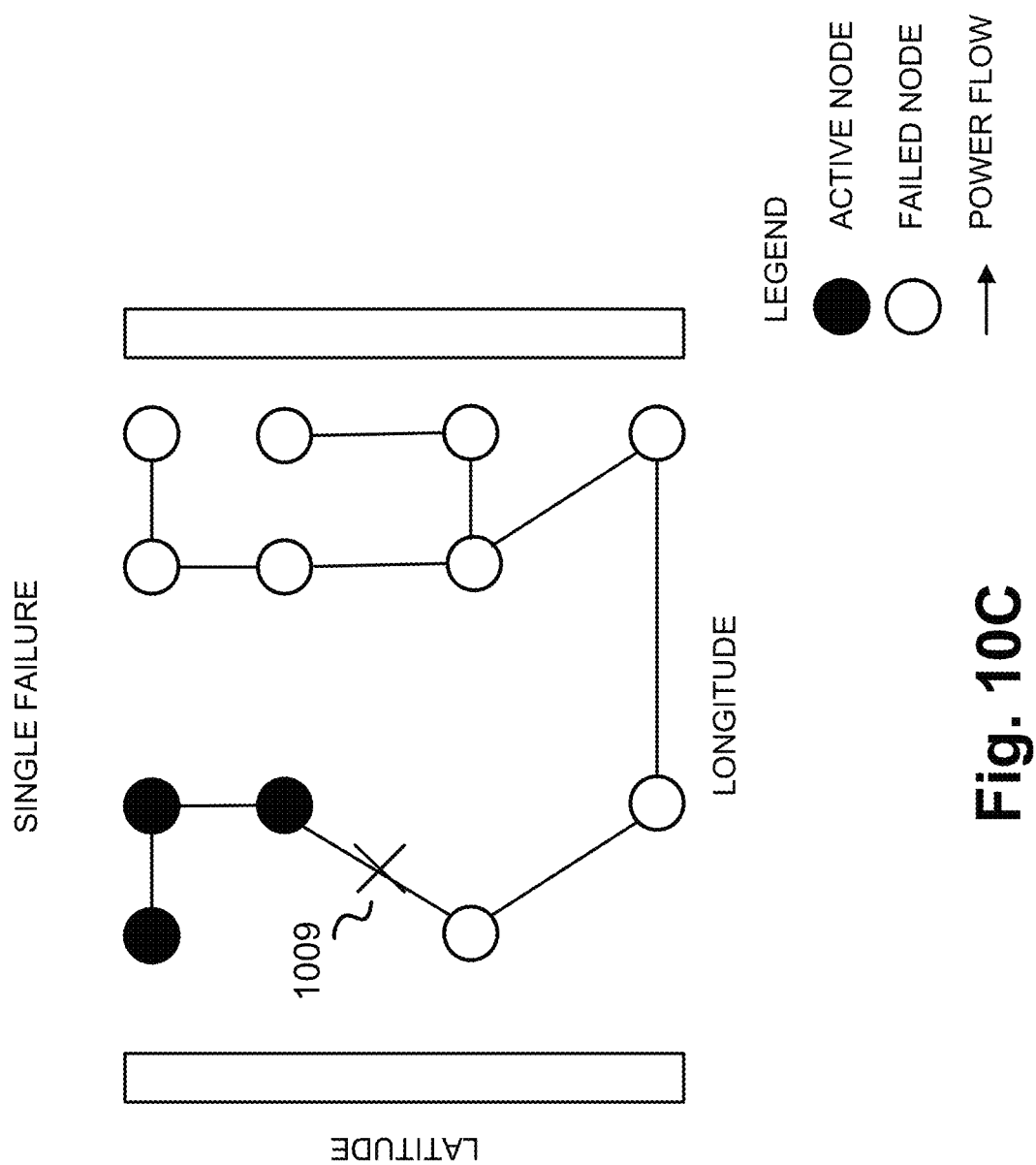
Figure 10D:
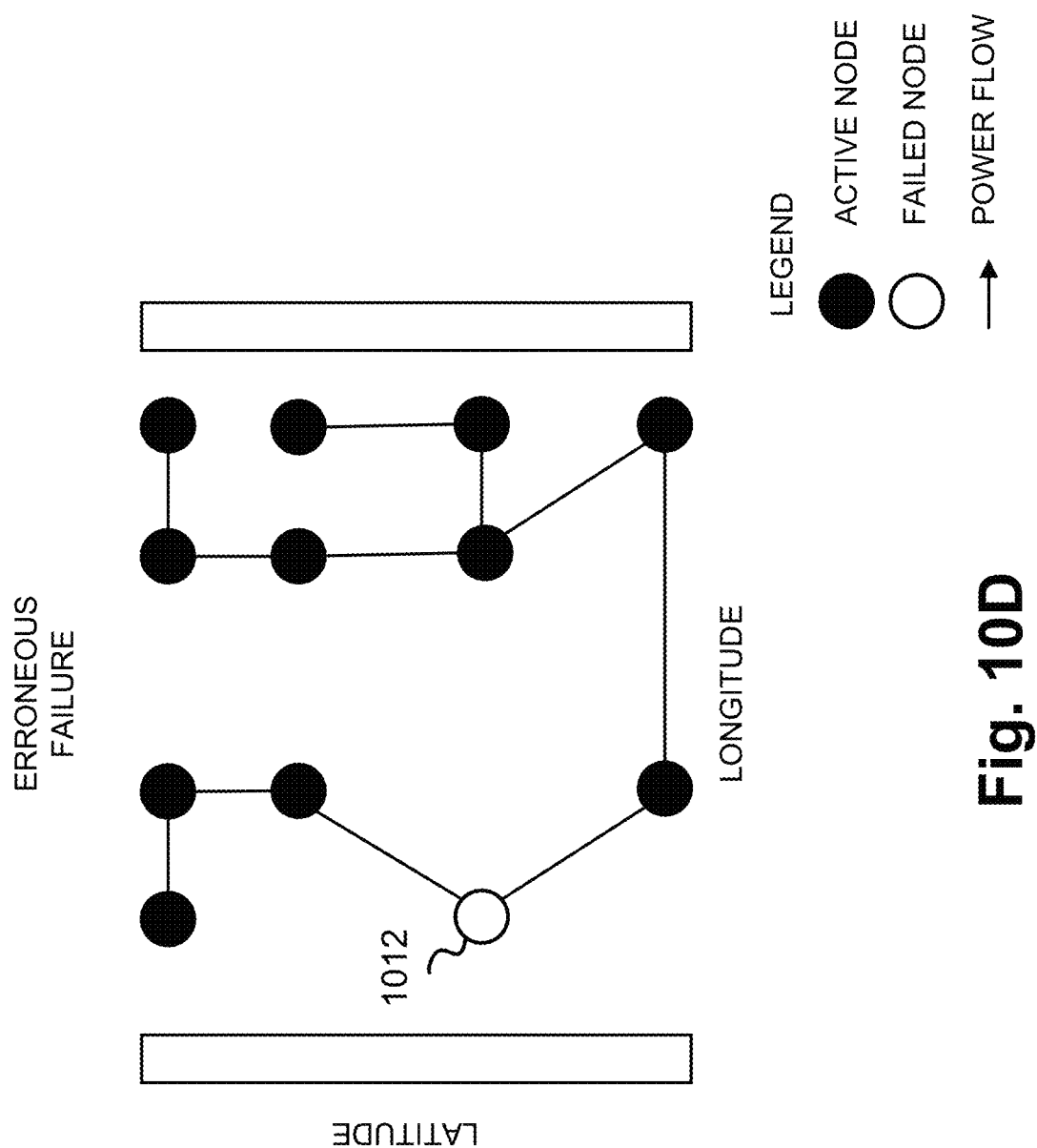
Figure 10E:
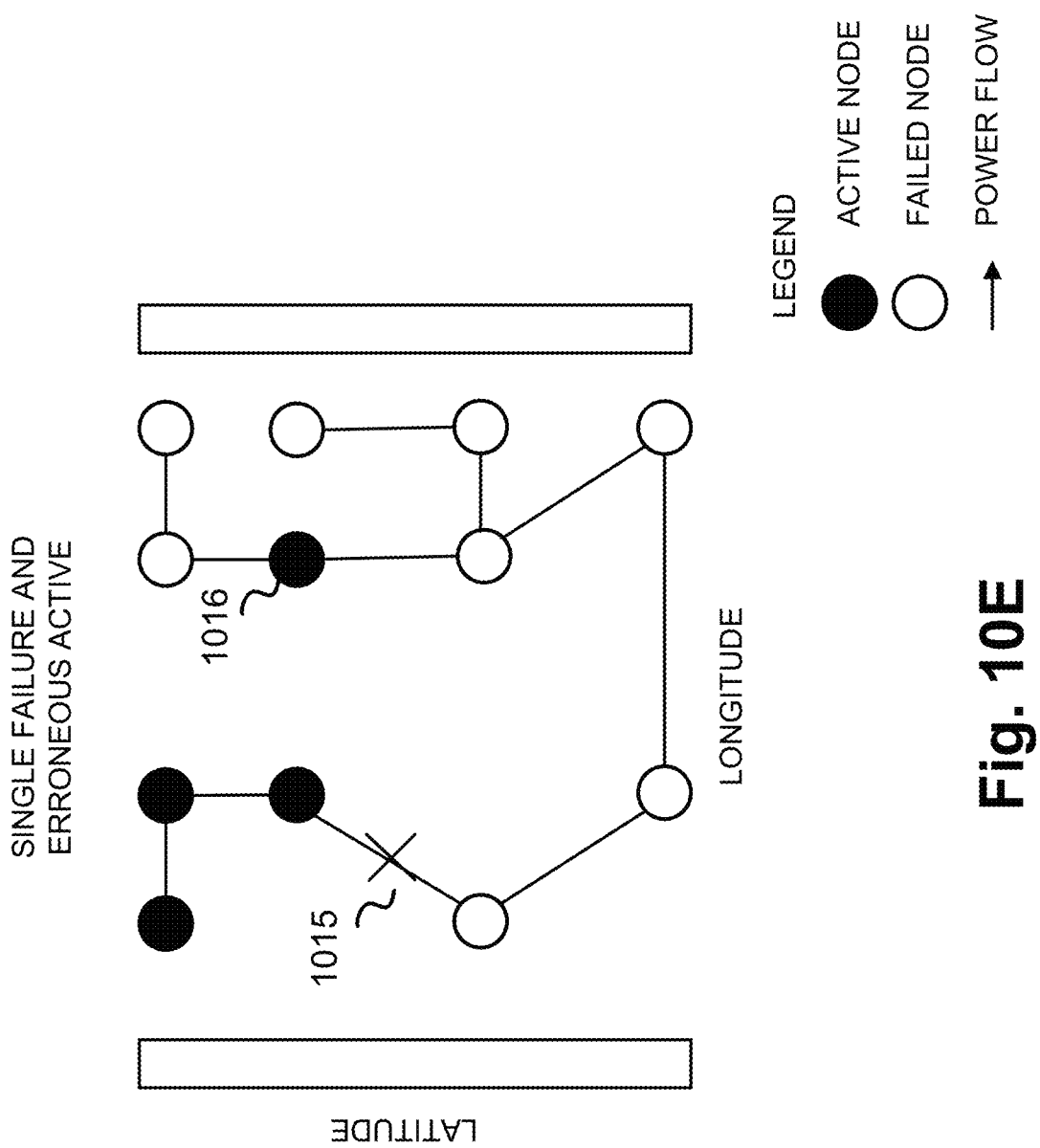

Type of outage field 916 stores data that indicates a type of outage, a type of failure, or other state or activity in the utility system to which the element contributed. For example, FIGS. 10A-10E are diagrams illustrating exemplary outages and failures. However, FIGS. 10A-10E are not intended to provide an exhaustive treatment of failures and outages in an electric utility system, and other types of outages, failures, and/or states or activities may be indicated as is known in the art. Referring to FIG. 10A, an exemplary arrangement of nodes (represented by circles) in a utility system, the connections between the nodes, and a direction of power flow are represented. As illustrated, some nodes are considered active while other nodes are considered failed. A single failure 1001 and multiple outages 1002 are illustrated. Referring to FIG. 10B, single failures 1005 and 1006, and an embedded outage 1007 are illustrated. An embedded outage may be described as one or more serial failures along the same circuit. Referring to FIG. 10C, a single failure 1009 is illustrated. In FIG. 10D, an erroneous failure 1012 is illustrated in which the surrounding nodes are active. In FIG. 10E, a single failure 1015 and an erroneous active 1016 are illustrated.

According to other exemplary implementations, the TSC model may include additional, fewer, and/or different instances of data and data values. For example, the TSC model may include equipment data, such as make and model number of the element and year of manufacture. Additionally, for example, the TSC model may include repair history data (e.g., dates and times repaired, reason for repair, parts repaired, etc.). The TSC model may be updated in real-time.

The TSC model represents the internal data structure that indicates the temporal and spatial information of the predictive outage system. The TSC model builds and maintains a flow simulation of data that indicates discrete geographic points within a utility environment, time, as well as past and current outage and restore events. The data of TSC model is provided to and used by predictive analytic engine 160 to learn patterns of behavior, as described herein. As previously described, the utility environment may be represented as an NGM. For example, an M-dimensional NGM, which includes interconnections representative of dependencies between the sensors and the utility environment, may be adapted over to time to indicate various relationships between elements in the utility environment. Further, once the interconnections of the M-dimensional NGM are determined, then past, current, and future states of individual elements of the utility environment may be determined. For example, predictive analytic engine 160 may query the TSC model.

Figure 11:
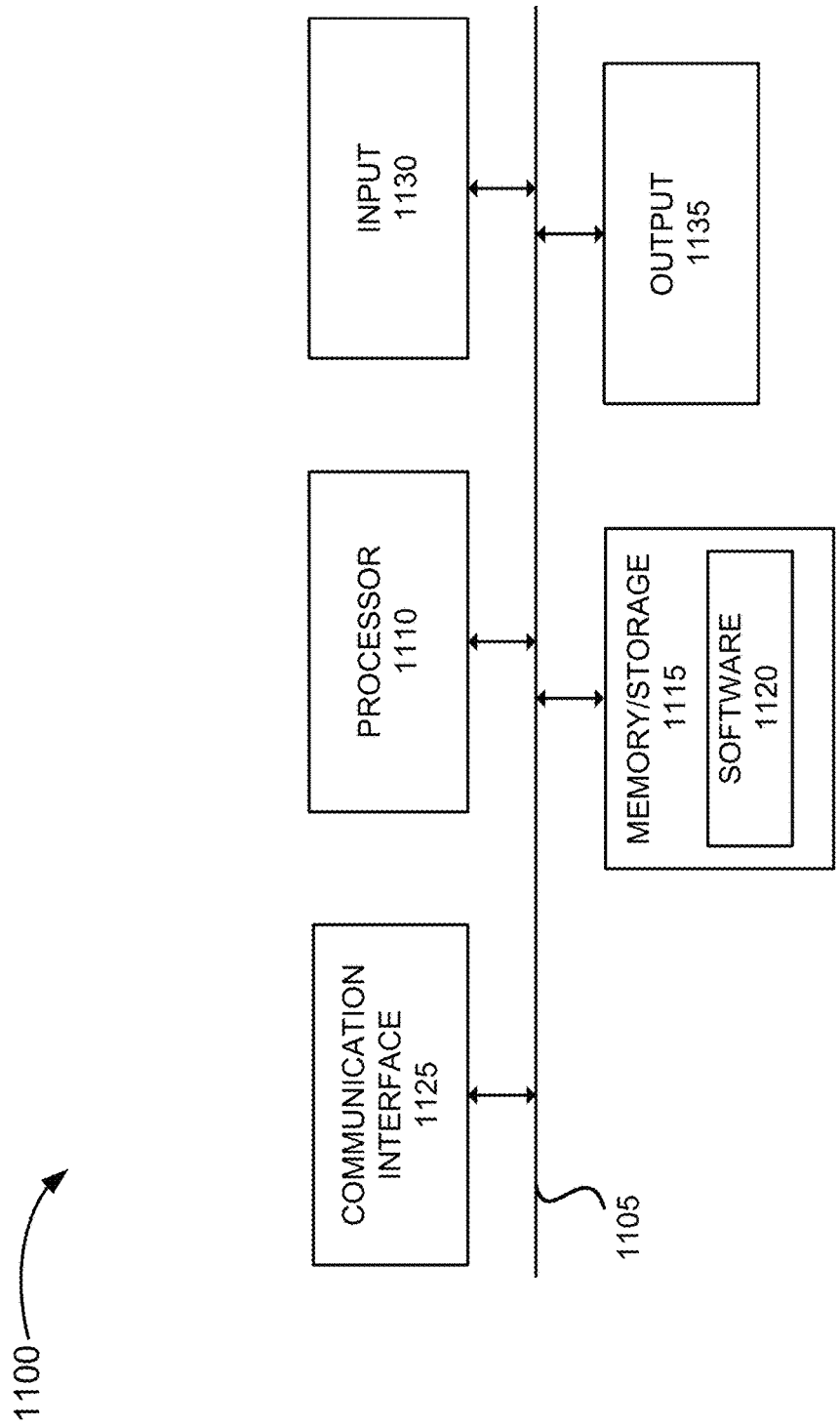
FIG. 11 is a diagram illustrating exemplary components of a device that may correspond to one or more of the devices illustrated herein.

FIG. 11 is a diagram illustrating exemplary components of a device 1100 that may correspond to one or more of the devices described herein. For example, device 1100 may correspond to components of outage notifier 105, QB-TS outage engine 130, predictive analytic engine 160, weather system 170, customer devices 180, and sensors 177, 182. As illustrated in FIG. 11, device 1100 includes a bus 1105, a processor 1110, a memory/storage 1115 that stores software 1120, a communication interface 1125, an input 1130, and an output 1135. According to other embodiments, device 1100 may include fewer components, additional components, different components, and/or a different arrangement of components than those illustrated in FIG. 11 and described herein. Additionally, or alternatively, according to other embodiments, multiple components may be combined into a single component. For example, processor 1110, memory/storage 1115, and communication interface 1125 may be combined.

Bus 1105 includes a path that permits communication among the components of device 1100. For example, bus 1105 may include a system bus, an address bus, a data bus, and/or a control bus. Bus 1105 may also include bus drivers, bus arbiters, bus interfaces, clocks, and so forth.

Processor 1110 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 1110 may be implemented as hardware (e.g., a microprocessor, etc.), a combination of hardware and software (e.g., a SoC, an ASIC, etc.), may include one or multiple memories (e.g., cache, etc.), etc.

Processor 1110 may control the overall operation or a portion of operation(s) performed by device 1100. Processor 1110 may perform one or multiple operations based on an operating system and/or various applications or computer programs (e.g., software 1120). Processor 1110 may access instructions from memory/storage 1115, from other components of device 1100, and/or from a source external to device 1100 (e.g., a network, another device, etc.). Processor 1110 may perform an operation and/or a process based on various techniques including, for example, multithreading, parallel processing, pipelining, interleaving, etc.

Memory/storage 1115 includes one or multiple memories and/or one or multiple other types of storage mediums. For example, memory/storage 1115 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 1115 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 1115 may include drives for reading from and writing to the storage medium.

Memory/storage 1115 may be external to and/or removable from device 1100, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 1115 may store data, software, and/or instructions related to the operation of device 1100.

Software 1120 includes an application or a program that provides a function and/or a process. As an example, with reference to outage notifier 105 and QB-TS outage engine 130, software 1120 may include an application that, when executed by processor 1110, provides the functions of the grooming service, as described herein. Also, as described herein, with reference to predictive analytic engine 160, software 1120 may include an application that, when executed by processor 1110, provides the functions of the predictive outage service, as described herein. Software 1120 may also include firmware, middleware, microcode, hardware description language (HDL), and/or other form of instruction or data.

Communication interface 1125 permits device 1100 to communicate with other devices, networks, systems, and/or the like. Communication interface 1125 includes one or multiple wireless interfaces. Communication interface 1125 may include one or multiple wired interfaces. For example, communication interface 1125 may include one or multiple transmitters and receivers, or transceivers. Communication interface 1125 may operate according to a protocol stack and a communication standard. Communication interface 1125 may include an antenna. Communication interface 1125 may include one or multiple line cards that provide the traffic control service, as described herein. For example, communication interface 1125 may include processor 1110, memory/storage 1115, and software 1120.

Input 1130 permits an input into device 1100. For example, input 1130 may include a keyboard, a mouse, a display, a touchscreen, a touchless screen, a button, a switch, an input port, speech recognition logic, and/or some other type of visual, auditory, tactile, etc., input component. Output 1135 permits an output from device 1100. For example, output 1135 may include a speaker, a display, a touchscreen, a touchless screen, a light, an output port, and/or some other type of visual, auditory, tactile, etc., output component.

Device 1100 may perform a process and/or a function, as described herein, in response to processor 1110 executing software 1120 stored by memory/storage 1115. By way of example, instructions may be read into memory/storage 1115 from another memory/storage 1115 (not shown) or read from another device (not shown) via communication interface 1125. The instructions stored by memory/storage 1115 cause processor 1110 to perform a process described herein. Alternatively, for example, according to other implementations, device 1100 performs a process described herein based on the execution of hardware (processor 1110, etc.).

Figure 12A:
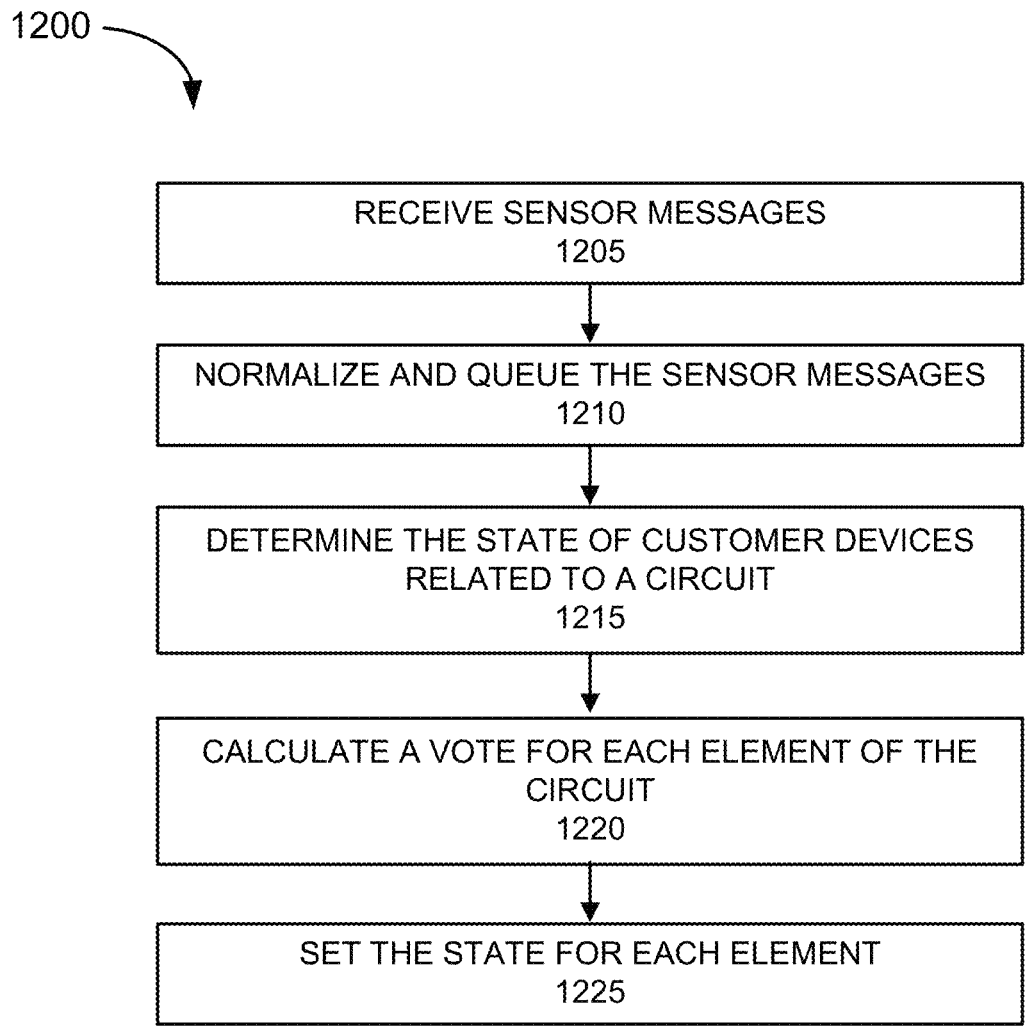
FIGS. 12A and 12B are flow diagrams illustrating exemplary processes of a grooming service included in the predictive outage service.
Figure 12B:
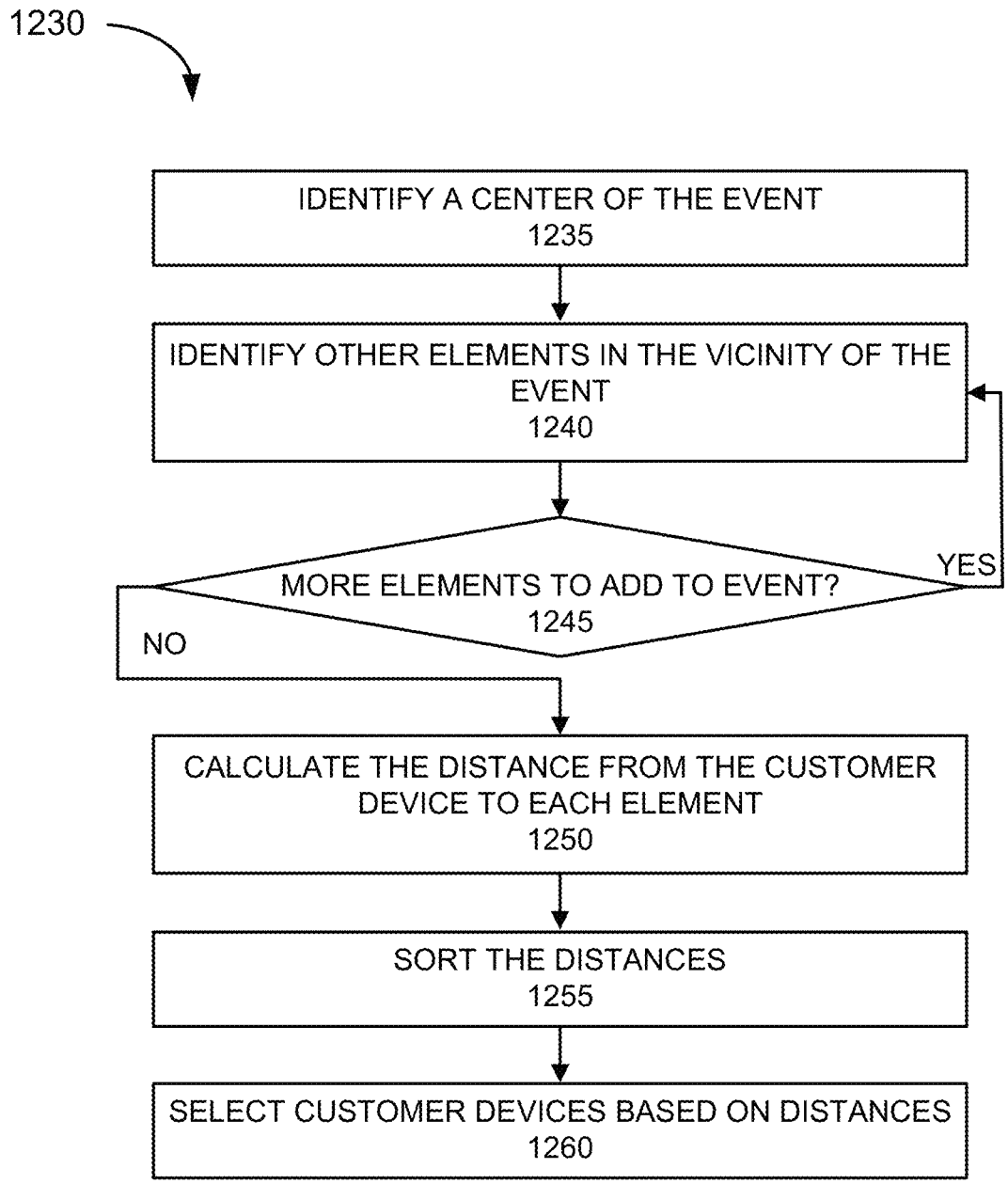

FIGS. 12A and 12B are flow diagrams illustrating an exemplary process 1200 and 1230 pertaining to the grooming service. Processes 1200 and 1230 are directed to processes previously described above with respect to FIGS. 3A-3F, as well as elsewhere in this description. According to an exemplary embodiment, QB-TS outage engine 130 performs steps of processes 1200 and 1230. For example, processor 1110 executes software 1120 to perform the steps illustrated in FIGS. 12A and 12B, and described herein.

Referring to FIG. 12A, in block 1205, sensor messages 1205 are received. For example, sensor messages are transmitted by sensors 182 and received by QB-TS outage engine 130. In block 1210, the sensor messages are normalized and queued. For example, QB-TS outage engine 130 normalizes the sensor data and places the normalized messages into the queue. In block 1215, the state of customer devices related to the circuit under analysis is determined. For example, referring to FIG. 12B, and exemplary process 1230, in block 1235, a center of the event is identified. In block 1240, other elements in the vicinity of the event are identified. For example, it may be determined whether additional elements of the utility system exhibit the event (e.g., a failure) in correspondence to the circuit pertaining to the normalized message. In block 1245, it is determined whether to add elements. For example, depending on the state of the other elements and/or the state of other customer devices correlated to the other elements, QB-TS outage engine 130 may determine whether to add more elements to the event. Process 1230 may iterate back to block 1240 when it is determined that additional elements are to be added (block 1245—YES). Otherwise, process 1230 may continue to block 1250, in which the distance from the customer devices to each element is calculated. For example, QB-TS outage engine 130 may calculate the distance based on the location data associated with the customer device and the element. In block 1255, the distances are sorted. For example, QB-TS outage engine 130 may sort the distances from closest to farthest. In block 1260, customer devices are selected based on the sorted distances. For example, QB-TS outage engine 130 may select a certain number of customer devices that are closest to the element.

Referring back to FIG. 12A, in block 1220, a vote for each element of the circuit is calculated. For example, QB-TS outage engine 130 may calculate the vote based on expression (1) described herein. In block 1225, the state for each element is set. For example, QB-TS outage engine 130 may store the state of each element in the TSC model based on the threshold outage value, as described herein.

Although FIGS. 12A and 12B illustrate exemplary processes 1200 and 1230 of the grooming service, which may be include in the predictive outage service, according to other embodiments, processes 1200 and/or 1230 may include additional operations, fewer operations, and/or different operations than those illustrated in FIGS. 12A and 12B, and described herein.

Dispatch of a repair vehicle and/or personnel can be both expensive and time-consuming. Additionally, depending on the degree of the outage (e.g., local versus widespread), the remedial measures needed to address the outage may be overwhelming. However, the predictive outage system, as described herein, may determine which alarm is dependent or independent of upstream and/or downstream alarms based on the patterns of alarms that have been historically analyzed and stored. Additionally, weather data may provide a basis to correlate various weather conditions to an alarm, and can be used to model local topological conditions that may affect the causality of the alarm. As an example, local topological conditions may include local vegetation (e.g., trees, bushes, or other forms of plants), proximity of the alarm to water sources (e.g., streams, lakes, oceans, inland waterways, or other water bodies), local terrain (e.g., open terrain without buildings/homes, developed terrain with buildings, high-wind terrain, or other type of terrain). The local topological conditions may be obtained via third party services (e.g., map data, etc.) and correlated to weather data and the alarms. As an example, the predictive outage system may predict that straight line winds will take out secondary grids across regions that have large overgrown vegetation that have not had trimming maintenance performed within a particular time period. When an outage has been determined, the type of outage and a location of the outage may be provided to an interested party (e.g., the utility service provider, etc.).

Figure 13:
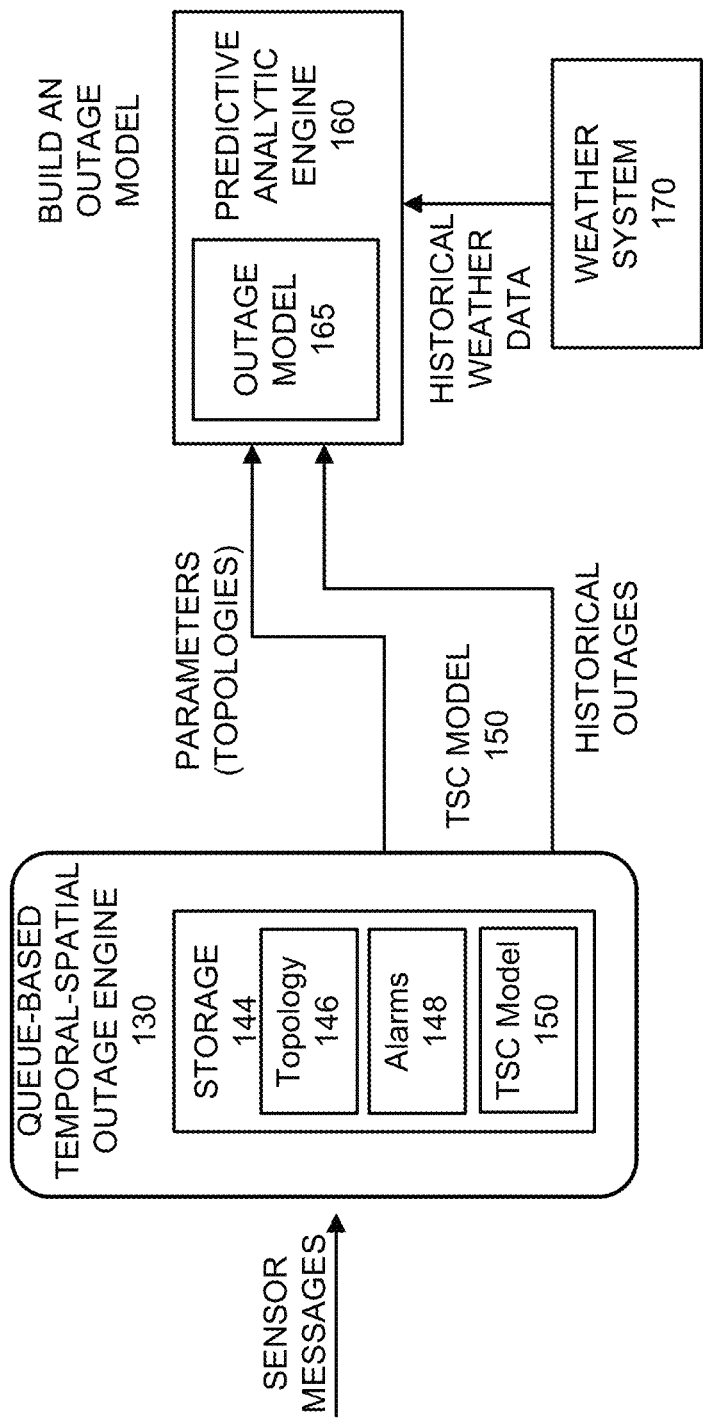
FIG. 13 is a diagram illustrating an exemplary process of the predictive outage system.
Figure 14:
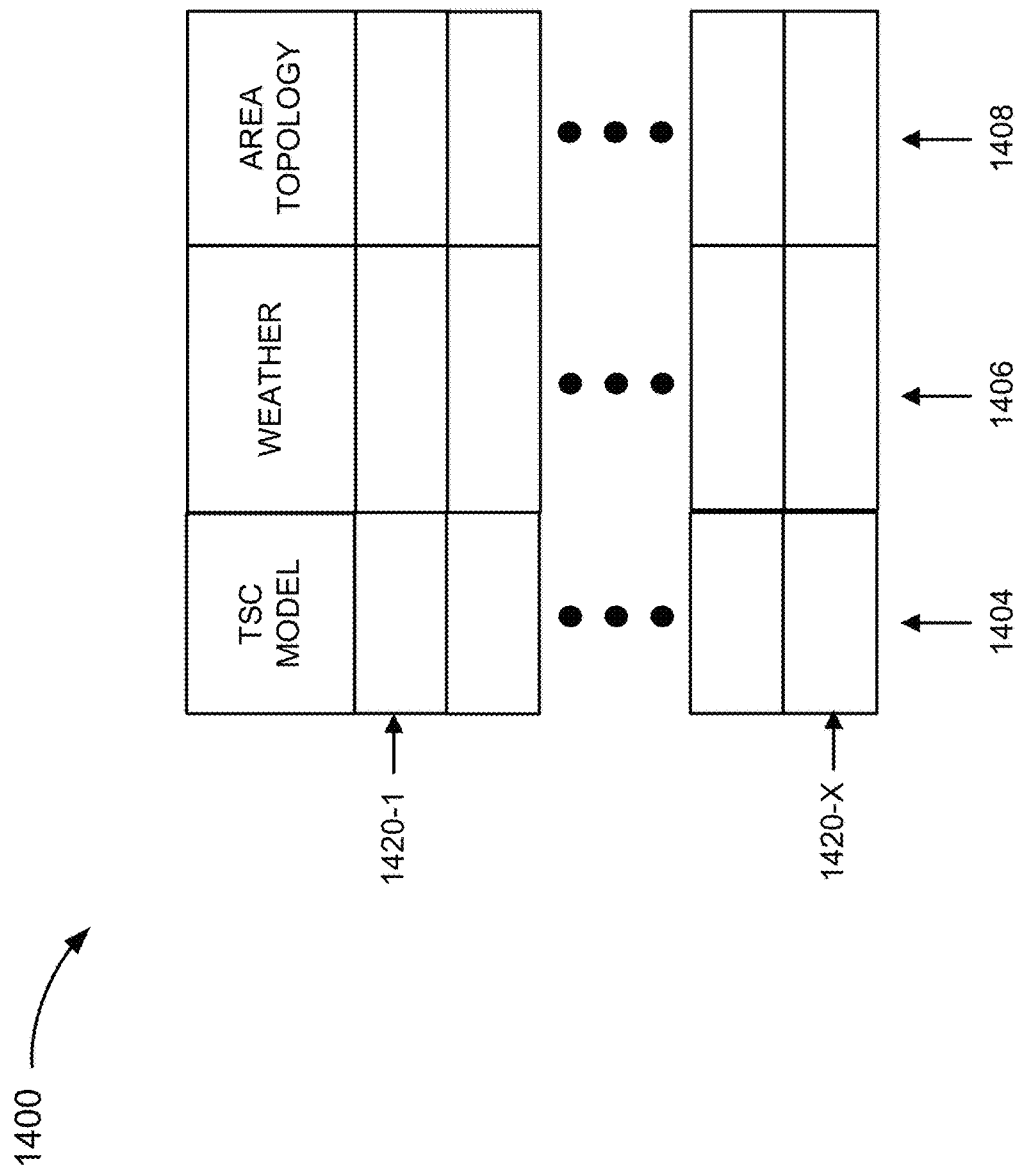
FIG. 14 is a diagram illustrating an exemplary data of an outage model.

FIG. 13 is a diagram illustrating an exemplary process of the predictive outage system. As illustrated, predictive analytic engine 160 may build an outage model (e.g., outage model 167) based on TSC model 150, which includes, among other data as described herein, historical outages and utility system topology. In addition, predictive analytic engine 160 may build the outage model based on historical weather data received from weather system 170, and area topology data, as previously described. In this way, the outage model may not only represent temporal and spatial dimensions of elements in the utility environment, but also weather and geographic artifacts. For example, FIG. 14 is a diagram illustrating exemplary data of an outage model. For example, the exemplary data is illustrated in a table 1400 that includes a TSC model field 1404, a weather field 1406, and an area topology field 1408. As further illustrated, table 1400 includes records 1420-1 through 1420-X that each includes a grouping of fields 1404 through 1408 that may be correlated. The data of the outage model is illustrated in tabular form merely for the sake of description. The outage model and corresponding data may be implemented in a data structure different from a table.

TSC model field 1404 stores data of TSC model 150, as previously described. Over time and as events occur in the utility system, updates to the TSC model data stored in TSC model field 1404 may be received from QB-TS outage engine 130. Weather field 1406 stores weather data. The weather data may indicate past, current, and forecasted weather conditions pertaining to a geographic area. For example, the weather data may indicate temperature, humidity, wind conditions (e.g., speed, etc.), precipitation (e.g., rain, sleet, snow, etc.), pressure, direction, time, location, storm conditions (e.g., moderate, mild, severe, record-breaking, hurricane, tsunami, etc.), other weather-related metrics/conditions, and/or environmental information (e.g., earthquake, etc.).

Area topology field 1408 stores data indicating characteristics of the geographic topology proximate to an element of the utility system. For example, the area topology data may indicate the type of vegetation (e.g., trees, bushes, or other forms of plants) and proximity to elements of the utility system, the type of water sources (e.g., streams, lakes, oceans, inland waterways, or other water bodies) and proximity to elements of the utility system, the type of terrain (e.g., open terrain without buildings/homes, developed terrain with buildings, high-wind terrain, or other type of terrain) proximate to the elements of the utility system.

According to other exemplary implementations, the outage model may include additional, fewer, and/or different instances of data and data values. For example, the outage model may also include other types of data, such as work order data pertaining to repairs of elements of the utility system (e.g., types of repairs, dates and times, etc.), trimming and removal of vegetation, and weather-related incidents (e.g., fallen trees due to storm at a particular locale, etc.). The work order data may be obtained from the utility service provider or local government.

Referring back to FIG. 13, as previously described, predictive analytic engine 160 includes machine learning logic that is configured to predict future outage events based on outage model 167. Predictive analytic engine 160 may correlate past outages with the historical weather data. For example, predictive analytic engine 160 may identify an outage that previously occurred based on the weather conditions indicated by the historical weather data. According to one example, predictive analytic engine 160 may determine that the weather conditions at a locale within which the element is located and during a time window of when the outage occurred for the element indicates a direct cause of the outage for the element of the utility system. By way of further example, predictive analytics engine 160 may determine that severe storm conditions (e.g., high wind, low temperatures, and snow) caused a failure to occur at a pole and a secondary line. According to another example, predictive analytic engine 160 may determine that the weather conditions at a locale within which the element is located and during a time window of when the outage occurred for the element indicates an indirect cause of the outage for the element utility system. By way of further example, predictive analytics engine 160 may determine that high wind conditions caused a tree to fall on a pole and primary and secondary lines. During the training process, predictive analytic engine 160 may filter out or identify outages that may have previously occurred that were not weather-related (e.g., directly, indirectly, etc.).

Figure 15:
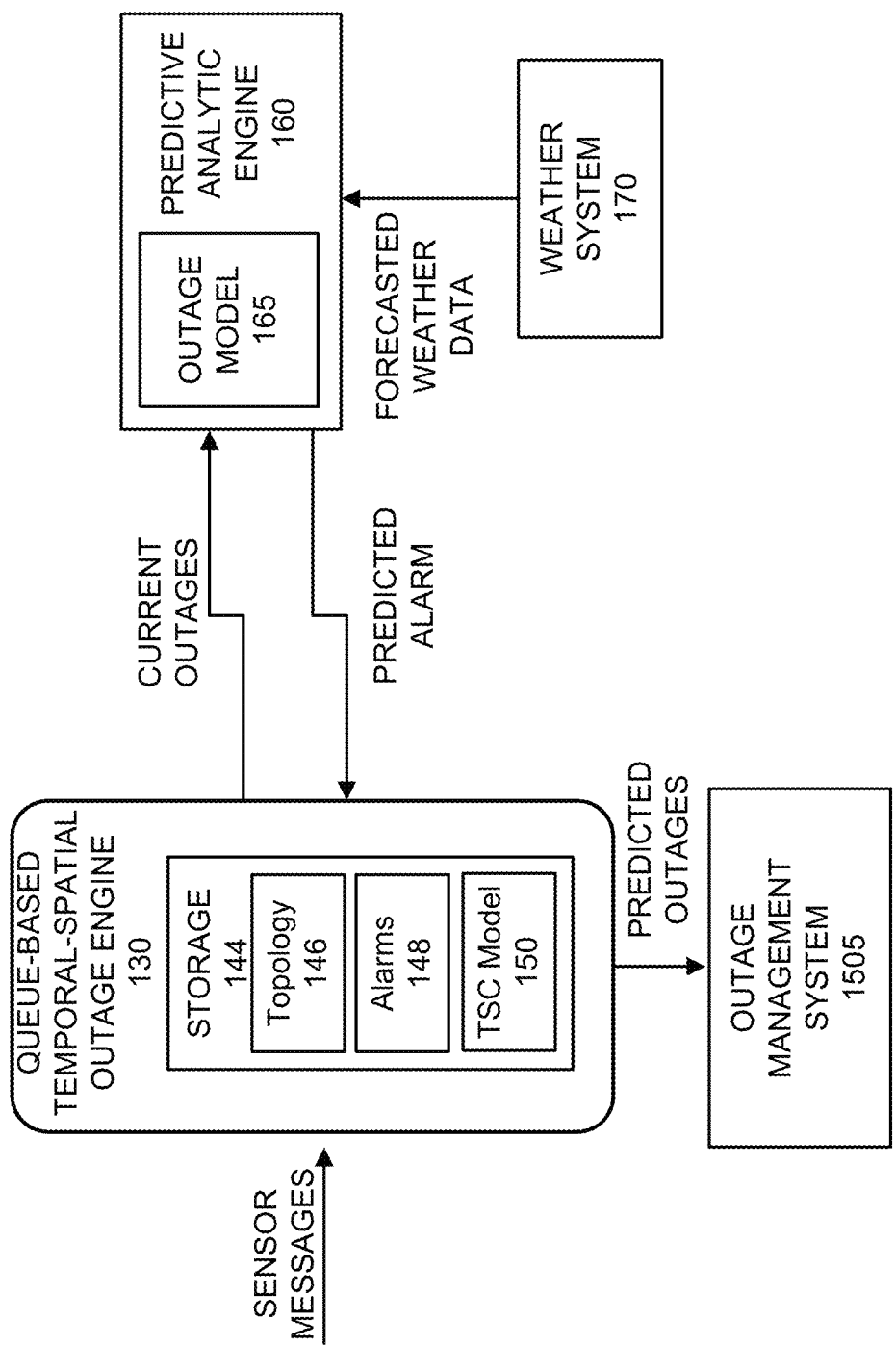
FIG. 15 is a diagram illustrating another exemplary process of the predictive outage service.

FIG. 15 is a diagram illustrating another exemplary process of the predictive outage service. As illustrated, in addition to a portion of the predictive outage system, an outage management system 1505 is depicted. Outage management system 1505 includes a network device that stores predictive outages, as described herein, which have been calculated by predictive analytic engine 160. The predictive outages may be provided (e.g., in push method and/or a pull method) to an interested party. For example, the utility service provider may obtain the predicted outage information.

Referring to FIG. 15, assume that sensor messages are received and processed by QB-TS outage engine 130 and outage notifier 105, as previously described. Additionally, assume that current outages/updates to the TSC model are being made to outage model 167, as time progresses. As further illustrated, weather system 170 is providing predictive analytic engine 160 with forecasted weather data pertaining to various geographic regions within which the utility system is located. The forecasted weather data may be stored in outage model 167. Although not illustrated, weather system 170 may provide predictive analytic engine 160 with current weather data.

Predictive analytic engine 160 predicts (potential) outages that may occur in the utility system based on outage model 167 and the machine learning logic. For example, predictive analytic engine 160 may compare weather-related outages, which may have been previously identified, to the current and future states of the utility system, the forecasted weather data, and area topology data. Predictive analytic engine 160 may identify similarities in states, weather conditions, and area topology based on the values of data related to the previous weather-related outages and current/future values of data pertaining to elements of the utility system.

As further illustrated, predictive analytic engine 160 may transmit predicted alarms to QB-TS outage engine 130. In response, QB-TS outage engine 130 may transmit the predicted alarms to outage management system 1505. The predicted alarms may be made available to an interested party. For example, the utility service provider may use the predicted alarm information as a basis to forestall the predicted alarm from occurring and/or minimize the impact of the predicted alarm based on taking remedial measures. For example, the utility service provider may dispatch personnel to a predicted alarm site, reconfigure or reroute electric service in view of a potential failure, etc.

Figure 16:
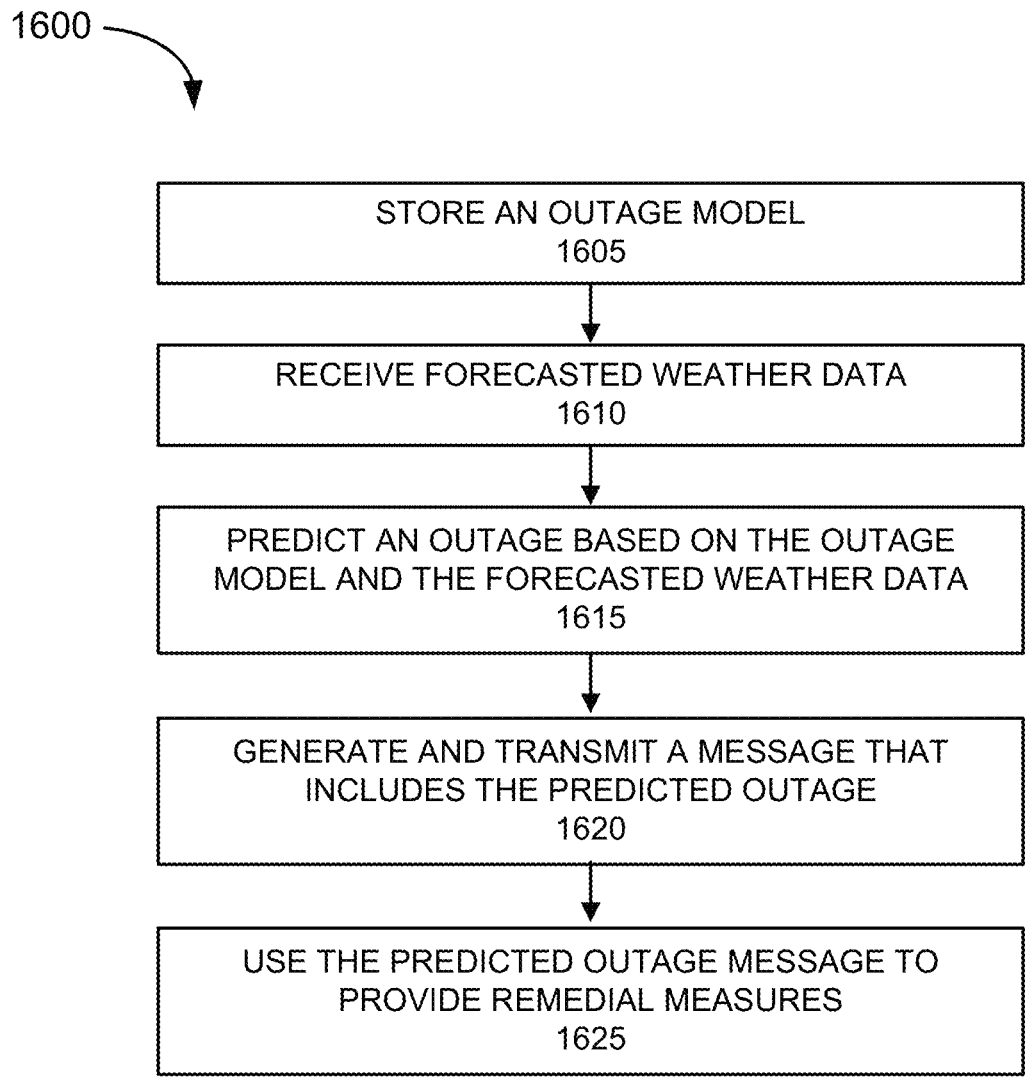
FIG. 16 is a flow diagram illustrating an exemplary process of the predictive outage service.

FIG. 16 is a flow diagram illustrating an exemplary process 1600 pertaining to the predictive outage service. Process 1600 is directed to a process previously described above with respect to FIGS. 13-15, as well as elsewhere in this description. According to an exemplary embodiment, predictive analytic engine 160 performs steps of process 1600. For example, processor 1110 executes software 1120 to perform the steps illustrated in FIG. 16, and described herein.

Referring to FIG. 16, in block 1605, an outage model is stored. For example, predictive outage engine 160 may store outage model 167, as described herein. In block 1610, forecasted weather data is received. For example, predictive analytic engine 160 receives forecasted weather data from weather system 170.

In block 1615, an outage is predicted based on the outage model and the forecasted weather data. For example, predictive analytic engine 160 uses a machine learning algorithm that predicts a (potential) outage/failure to occur in a utility system based on previously identified weather-related outages and predicted conditions/states of the utility system, weather, and area topology data.

In block 1620, a message that includes the predicted outage is generated and transmitted. For example, predictive analytic engine 160 generates and transmits a message, which includes the predicted outage information, to outage management system 1505.

In block 1625, the predicted outage message is used to provide remedial measures. For example, a utility service provider may use the predicted outage information as a basis to forestall the predicted outage from occurring and/or minimize the impact of the predicted outage based on remedial measures. For example, the utility service provider may dispatch personnel to a predicted outage site, reconfigure or reroute electric service in view of the potential failure, etc.

Although FIG. 16 illustrates exemplary process 1600 of the predictive outage service, according to other embodiments, process 1600 may include additional operations, fewer operations, and/or different operations than those illustrated in FIG. 16, and described herein.

Figure 17:
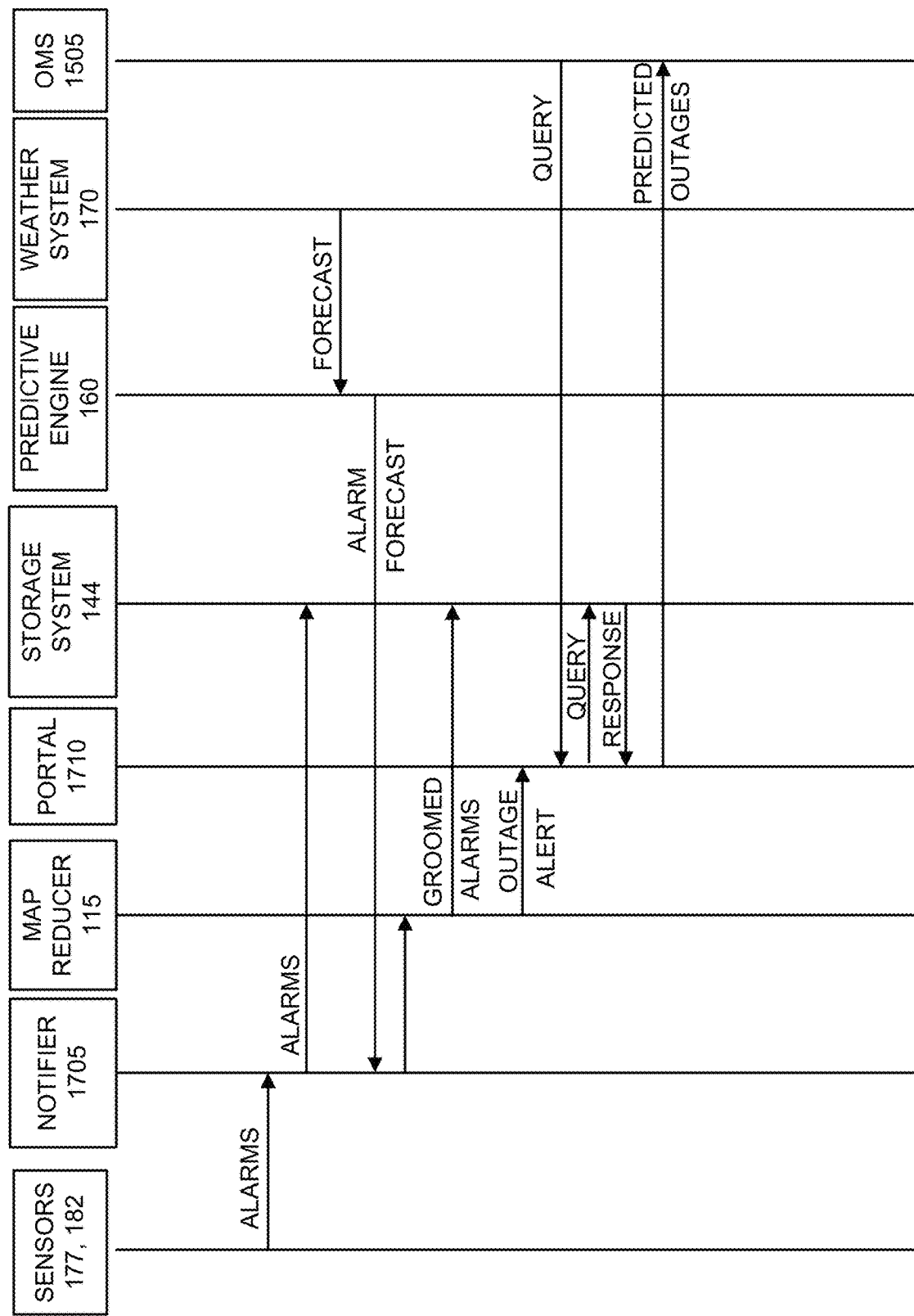
FIG. 17 is a diagram illustrating yet another exemplary process of the predictive outage service.

FIG. 17 is a diagram illustrating yet another exemplary process of the predictive outage service. In addition to components previously described, a notifier 1705 and a portal 1710 are illustrated. For example, notifier 1705 includes a component that receives sensor messages from sensors 177, 182, stores the sensor messages in storage system 144, and interfaces with predictive engine 160. Portal 1710 includes a component that interfaces with outage management system 1505. Notifier 1705 and portal 1710 may be implemented in outage notifier 105.

Referring to FIG. 17, sensor messages (e.g., alarms) are received and stored in storage system 144 via notifier 1705. During this time, predictive analytic engine 160 may continuously receive forecasted weather data from weather system 170. Based on the forecasted weather data, predictive analytic engine 160 generates predictive outages (e.g., alarm forecast) pertaining to one or multiple elements of the utility system. Predictive analytic engine 160 transmits the predicted outage message to notifier 1705, which is subsequently groomed by map reducer 115, and stored in stored in storage system 144. Outage management system 1505 may transmit a query to portal 1710 for the presence of predicted outages. For example, the query may be user-initiated (e.g., by a utility service person) or automatic based on a push or pull method. In response to the query, portal 1710 queries storage system 144 for any predicted outages stored in storage system 144. In this example, storage system 144 stores predicted outage information, and portal 1710 transmits the predicted outage information to outage management system 1505.

The foregoing description of embodiments provides illustration, but is not intended to be exhaustive or to limit the embodiments to the precise form disclosed. In the preceding description, various embodiments have been described with reference to the accompanying drawings. However, various modifications and changes may be made thereto, and additional embodiments may be implemented, without departing from the broader scope of the invention as set forth in the claims that follow. The description and drawings are accordingly to be regarded as illustrative rather than restrictive.

In addition, while a series of blocks have been described with regard to the processes illustrated in FIGS. 7, 12A, 12B, and 16, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 1110, etc.), or a combination of hardware and software (e.g., software 1120). The embodiments have been described without reference to the specific software code since the software code can be designed to implement the embodiments based on the description herein and commercially available software design environments/languages.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 1110) of a computational device. A non-transitory storage medium includes one or more of the storage mediums described in relation to memory/storage 1115.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:
   receiving, by a network device and from customer devices, first sensor messages, wherein each first sensor message indicates a first power state of on or off, a first location, and a first timestamp pertaining to one of the customer devices;
   correlating, by the network device based on the first sensor messages, a candidate circuit of a utility system with the customer devices;
   selecting, by the network device, an element of the utility system based on the first power state, the first location, the first timestamp of each of the customer devices and the candidate circuit;
   determining, by the network device and in response to the selecting, a second power state of on or off for the element of the utility system based on the first power state, the first location, and the first timestamp of one or more of the customer devices, and a second location and a time window pertaining to the element;
   storing, by the network device and in response to the determining, a temporal and spatial model that includes the second power state, the second location, and the time period pertaining to the element;
   receiving, by the network device, weather data pertaining to the second location and the time period;
   generating, by the network device, an outage model based on the temporal and spatial model and the weather data;
   storing, by the network device in response to the generating, the outage model;
   receiving, by the network device, forecasted weather data;
   calculating, by the network device, a predicted outage pertaining to one or more elements of the utility system based on the outage model and the forecasted weather data; and
   transmitting, by the network device, a predicted outage message that includes the predicted outage.

2. The method of claim 1, further comprising:
   storing, by the network device, topology data pertaining to elements of the utility system, wherein the topology data includes locations of the elements, types of the elements, identifiers of the elements, and connection and circuit data that indicates connections between two or more of the elements, a circuit formed by the two or more elements, and a direction of flow of electricity between the two or more elements, and wherein the element is one of the elements; and
   using, by the network device, the topology data to determine the second power state of the element.

3. The method of claim 2, further comprising:
   determining, by the network device, a type of outage from among multiple types of outages for the one or more elements based on the outage model, the topology data, and the forecasted weather data.

4. The method of claim 1, wherein each first sensor message indicates that the first power state is off, and the method further comprising:
identifying, by the network device and in response to the receiving of the first sensor messages, a center of a power failure event pertaining to the customer devices;
calculating, by the network device and in response to the identifying, a distance from each customer device to the element of the utility system;
selecting, by the network device and based on the distances calculated, one or more of the first power states associated with one or more of the customer devices that are closest to the second location of the element; and
assigning, by the network device and in response to the selecting of the one or more first power states, the second power state to be the same as the one or more of the first power states.

5. The method of claim 4, further comprising:
receiving, by the network device and from other customer devices, second sensor messages, wherein each second sensor message indicates a second power state of on or off, a second location, and a second timestamp pertaining to one of the other customer devices;
selecting, by the network device, another element of the utility system based on another second location and another time window pertaining to the other element and the second location and the time window pertaining to the element; and
determining, by the network device and in response to the receiving of the second sensor messages and the selecting of the other element, whether the other element of the utility system also has a power failure event.

6. The method of claim 1, wherein the predicated outage message is transmitted to a utility service provider of the utility system, wherein the utility system delivers electricity to customers, and wherein the customer devices are located at customer premises of the customers.

7. The method of claim 1, wherein the customer devices include one or more of an Internet of Things (IoT) device, an optical network unit (ONU), a smart device, a router, a set top box, or an appliance, and wherein the element of the utility system is upstream from the customer devices.

8. The method of claim 1, wherein the outage model includes area topology data that indicates one or more of a type of vegetation, a type of water source, or a type of terrain proximate to each element of the utility system.

9. A network device comprising:
a communication interface;
a memory, wherein the memory stores instructions; and
a processor, wherein the processor executes the instructions to:
receive, via the communication interface and from customer devices, first sensor messages, wherein each first sensor message indicates a first power state of on or off, a first location, and a first timestamp pertaining to one of the customer devices;
correlate, based on the first sensor messages, a candidate circuit of a utility system with the customer devices;
select an element of the utility system based on the first power state, the first location, the first timestamp of each of the customer devices and the candidate circuit;
determine, in response to the selection, a second power state of on or off for the element of the utility system based on the first power state, the first location, and the first timestamp of one or more of the customer devices, and a second location and a time window pertaining to the element;
store, in response to the determination, a temporal and spatial model that includes the second power state, the second location, and the time period pertaining to the element;
receive, via the communication interface, weather data pertaining to the second location and the time period;
generate an outage model based on the temporal and spatial model and the weather data;
store the outage model;
receive, via the communication interface, forecasted weather data;
calculate a predicted outage pertaining to one or more elements of the utility system based on the outage model and the forecasted weather data; and
transmit, via the communication interface, a predicted outage message that includes the predicted outage.

10. The network device of claim 9, wherein the processor further executes the instructions to:
store topology data pertaining to elements of the utility system, wherein the topology data includes locations of the elements, types of the elements, identifiers of the elements, and connection and circuit data that indicates connections between two or more of the elements, a circuit formed by the two or more elements, and a direction of flow of electricity between the two or more elements, and wherein the element is one of the elements; and
use the topology data to determine the second power state of the element.

11. The network device of claim 9, wherein each first sensor message indicates that the first power state is off, and wherein the processor further executes the instructions to:
identify in response to the receipt of the first sensor messages, a center of a power failure event pertaining to the customer devices;
calculate, in response to the identification, a distance from each customer device to the element of the utility system;
select, based on the distances calculated, one or more of the first power states associated with one or more of the customer devices that are closest to the second location of the element; and
assign, in response to the selection of the one or more first power states, the second power state to be the same as the one or more of the first power states.

12. The network device of claim 11, wherein the processor further executes the instructions to:
receive from other customer devices, second sensor messages, wherein each second sensor message indicates a second power state of on or off, a second location, and a second timestamp pertaining to one of the other customer devices;
select another element of the utility system based on another second location and another time window pertaining to the other element and the second location and the time window pertaining to the element; and
determine, in response to the receipt of the second sensor messages and the selection of the other element, whether the other element of the utility system also has a power failure event.

13. The network device of claim 9, wherein the predicted outage message is transmitted to a utility service provider of the utility system, wherein the utility system delivers electricity to customers, and wherein the customer devices are located at customer premises of the customers.

14. The network device of claim 9, wherein the outage model includes area topology data that indicates one or more of a type of vegetation, a type of water source, or a type of terrain proximate to each element of the utility system.

15. The network device of claim 9, wherein the customer devices include one or more of an Internet of Things (IoT) device, an optical network unit (ONU), a smart device, a router, a set top box, or an appliance, and wherein the element of the utility system is upstream from the customer devices.

16. A non-transitory, computer-readable storage medium storing instructions executable by a processor of a computational device, which when executed cause the computational device to:
 receive from customer devices, first sensor messages, wherein each first sensor message indicates a first power state of on or off, a first location, and a first timestamp pertaining to one of the customer devices;
 correlate, based on the first sensor messages, a candidate circuit of a utility system with the customer devices;
 select an element of the utility system based on the first power state, the first location, the first timestamp of each of the customer devices and the candidate circuit;
 determine, in response to the selection, a second power state of on or off for the element of the utility system based on the first power state, the first location, and the first timestamp of one or more of the customer devices, and a second location and a time window pertaining to the element;
 store, in response to the determination, a temporal and spatial model that includes the second power state, the second location, and the time period pertaining to the element;
 receive weather data pertaining to the second location and the time period;
 generate an outage model based on the temporal and spatial model and the weather data;
 store, in response to the generation, the outage model;
 receive forecasted weather data;
 calculate a predicted outage pertaining to one or more elements of the utility system based on the outage model and the forecasted weather data; and
 transmit a predicted outage message that includes the predicted outage.

17. The non-transitory, computer-readable medium of claim 16, further storing instructions executable by the processor of the computational device, which when executed cause the computational device to:
 store topology data pertaining to elements of the utility system, wherein the topology data includes locations of the elements, types of the elements, identifiers of the elements, and connection and circuit data that indicates connections between two or more of the elements, a circuit formed by the two or more elements, and a direction of flow of electricity between the two or more elements, and wherein the element is one of the elements; and
 use the topology data to determine the second power state of the element.

18. The non-transitory, computer-readable medium of claim 16, wherein each first sensor message indicates that the first power state is off, and the non-transitory, computer-readable medium further storing instructions executable by the processor of the computational device, which when executed cause the computational device to:
 identify in response to the receipt of the first sensor messages, a center of a power failure event pertaining to the customer devices;
 calculate, in response to the identification, a distance from each customer device to the element of the utility system;
 select, based on the distances calculated, one or more of the first power states associated with one or more of the customer devices that are closest to the second location of the element; and
 assign, in response to the selection of the one or more first power states, the second power state to be the same as the one or more of the first power states.

19. The non-transitory, computer-readable storage medium of claim 18, further storing instructions executable by the processor of the computational device, which when executed cause the computational device to:
 receive from other customer devices, second sensor messages, wherein each second sensor message indicates a second power state of on or off, a second location, and a second timestamp pertaining to one of the other customer devices;
 select another element of the utility system based on another second location and another time window pertaining to the other element and the second location and the time window pertaining to the element; and
 determine, in response to the receipt of the second sensor messages and the selection of the other element, whether the other element of the utility system also has a power failure event.

20. The non-transitory, computer-readable storage medium of claim 19, wherein the predicted outage message is transmitted to a utility service provider of the utility system, wherein the utility system delivers electricity to customers, and wherein the customer devices are located at customer premises of the customers.

* * * * *